United States Patent
Kim et al.

(10) Patent No.: US 8,430,959 B2
(45) Date of Patent: Apr. 30, 2013

(54) APPARATUS AND METHODS FOR PREPARATION OF HIGH-PURITY SILICON RODS USING MIXED CORE MEANS

(75) Inventors: Hee Young Kim, Daejeon (KR); Kyung Koo Yoon, Daejeon (KR); Yong Ki Park, Daejeon (KR); Won Choon Choi, Daejeon (KR); Won Wook So, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 697 days.

(21) Appl. No.: 12/160,241

(22) PCT Filed: May 11, 2007

(86) PCT No.: PCT/KR2007/002345
§ 371 (c)(1),
(2), (4) Date: Jul. 8, 2008

(87) PCT Pub. No.: WO2007/133025
PCT Pub. Date: Nov. 22, 2007

(65) Prior Publication Data
US 2009/0130333 A1     May 21, 2009

(30) Foreign Application Priority Data

May 11, 2006     (KR) ................. 10-2006-0042301

(51) Int. Cl.
    *C30B 25/02*     (2006.01)
(52) U.S. Cl.
    USPC ............ 117/89; 117/84; 117/85; 117/86; 117/88; 117/106; 117/200; 117/201

(58) Field of Classification Search .............. 117/84–86, 117/88–89, 94, 106, 200–201, 935
See application file for complete search history.

(56) References Cited

U.S. PATENT DOCUMENTS

| | | | |
|---|---|---|---|
| 3,941,900 A | 3/1976 | Stut et al. | |
| 4,179,530 A * | 12/1979 | Koppl et al. | 427/545 |
| 4,215,154 A | 7/1980 | Behensky et al. | |
| 4,528,121 A * | 7/1985 | Matsushita et al. | 252/516 |
| 5,237,454 A | 8/1993 | Snyder | |
| 5,277,934 A | 1/1994 | Gilbert et al. | |
| 5,284,640 A | 2/1994 | Jernegan et al. | |
| 5,895,594 A * | 4/1999 | Fuchs | 219/411 |
| 5,976,481 A | 11/1999 | Kubota et al. | |

(Continued)

OTHER PUBLICATIONS

William C. O'Mara, Robert B. Herring, and Lee P. Hunt, eds. Handbook of Semiconductor Silicon Technology, 1990, pp. 46-48; Noyes Publications, New Jersey.

*Primary Examiner* — Michael Kornakov
*Assistant Examiner* — Kenneth A Bratland, Jr.
(74) *Attorney, Agent, or Firm* — Frommer Lawrence & Haug LLP; Ronald R. Santucci

(57) ABSTRACT

Disclosed are a method and an apparatus for preparing a polycrystalline silicon rod using a mixed core means, comprising: installing a first core means made of a resistive material together with a second core means made of silicon material in an inner space of a deposition reactor; electrically heating the first core means and pre-heating the second core by the first core means which is electrically heated; electrically heating the preheated second core means; and supplying a reaction gas into the inner space in a state where the first core means and the second core means are electrically heated for silicon deposition.

12 Claims, 13 Drawing Sheets

U.S. PATENT DOCUMENTS 6,221,155 B1    4/2001   Keck et al.
6,544,333 B2 *   4/2003   Keck et al. .................... 117/200
2009/0191336 A1 *   7/2009   Chandra et al. ............ 427/248.1
2010/0040803 A1 *   2/2010   Kim et al. .................... 427/588

* cited by examiner (a)

(b)

(a)

(b)

(a)

(b)

APPARATUS AND METHODS FOR PREPARATION OF HIGH-PURITY SILICON RODS USING MIXED CORE MEANS

This application is a 371 of PCT/KR2007/002345 filed on May 11, 2007, published on Nov. 23, 2007 under publication number WO 2007/133025 A1 which claims priority benefits from South Korean Patent Application Number 10-2006-0042301 filed May 11, 2006, the disclosure of which is hereby incorporated by reference.

TECHNICAL FIELD

The present invention relates to a method and an apparatus for preparing rod-shaped polycrystalline silicon. More particularly, the present invention relates to a method and an apparatus which can minimize difficulties in constructing and operating an electrical heating system for heating a core means installed in a silicon deposition reactor used for bulk production of rod-shaped polycrystalline silicon (silicon polycrystal, multicrystalline silicon, polysilicon or poly-Si).

BACKGROUND ART

In general, high-purity polycrystalline silicon is used as an important raw material for a semiconductor device, a solar cell, a chemical processing unit, an industrial system, or a small-sized and other highly integrated precision devices, which is respectively composed of a material with high purity or semiconducting properties.

The polycrystalline silicon is prepared using a silicon deposition method, wherein silicon atoms deposit continuously on the surface of silicon by thermal decomposition and/or hydrogen reduction of a highly-purified silicon atom-containing reaction gas.

For bulk production of polycrystalline silicon, a bell-jar type, a tube-type or a chamber-type deposition reactor has been mainly used. According to the deposition reactor, polycrystalline silicon is prepared generally in the shape of a rod with a circular or oval cross-section whose diameter is in the range of about 50-300 mm.

In the deposition reactor, a core means is basically installed for preparation of the silicon rod. For commercial production, the core means is composed of a plurality of core units respectively made of a core material (i.e., core element), through which electricity can flow at a deposition reaction temperature. The core units constituting a core means are connected to electrode units, respectively, to complete an electrical heating means in the reactor shell. Then, silicon deposits continuously on the surface of the electrically heated core means by a deposition reaction of a reaction gas comprising a silicon-containing component. As described above, the silicon deposition output is formed and enlarged in a thickness direction, that is, in an outward, radial direction of the concentric cross-section of the deposition output, and thus a rod-shaped polycrystalline silicon product can be obtained finally.

To obtain a high-purity product with minimized impurity contamination, the core units represented by a core means may be made of or fabricated with a non-contaminating core element. An ideal material for the core element is high-purity silicon that is formed like a rod, a wire or a filament, a hollow duct or a tube, a strip or ribbon, or a sheet, etc.

The polycrystalline silicon rods obtained finally by forming the deposition output around the core means are (i) divided or pulverized into the shape of chunks, nuggets, chips or particles, (ii) grouped according to size, (iii) subject to an additional step of cleaning, if required, to remove impurity components formed on the surface of silicon fragments during the pulverizing step, (iv) melted in a crucible which is heated above the melting point of silicon, and then (v) formed into an ingot, block, sheet, ribbon or film, etc., according to a use thereof.

An electrical heating means constructed within the deposition reactor shell consists of a core means which is electrically heated and an electrode means electrically connecting the core means to an electric power supply source located outside of the shell and/or electrically connecting the core units with each other. This electrical heating means serves to provide (i) an electrical heating required for maintaining a deposition reaction temperature, (ii) a starting substrate for silicon deposition, and (iii) a mechanical structure for stably supporting the silicon rod that grows in diameter and weight as the deposition continues.

Each of the core units constituting the core means should be made of or fabricated with such a core element material that satisfies the function and role of the core means. To achieve this purpose, (i) a high-purity silicon is melted alone or with a dopant component, (ii) the silicon melt is subject to crystal growing or casting, and (iii) the core element is prepared through a forming process and/or a machining process, thereby shaping its cross-section into a circle, an oval, a concentric circle or polygon, a triangle, a tetragon or a hexagon, etc.; its diameter or diagonal length may be in the range of about 3-30 mm or 5-100 mm, respectively, with its length being about 0.5-6 m.

There are several ways in preparing the core element. Each piece of the core element may be prepared in a sequential manner. Or, a plurality of core elements with a uniform size and shape may be prepared simultaneously by simply cutting a large-sized single crystal ingot. Further, a long silicon core element may be prepared by melt connection of a plurality of short pieces of core element under a clean atmosphere.

According to the description in the reference document of W. C. O'Mara, R. B. Herring and L. P. Hunt, "Handbook of Semiconductor Silicon Technology", pp 46-48, Noyes, Publication, 1990, preparing a core element made of the high-purity silicon material, such as a core rod, a slim rod or a starter filament having a small diameter, entails a great deal of economical and technological burden in a process of preparing polycrystalline silicon rod using the deposition reactor. When the core element is made of a high-purity silicon, whose resistivity is extremely high at room temperature and drastically decreases with temperature increase, the core means begins to be electrically heated due to the occurrence of an apparent current through each core unit connected and fixed to a pair of electrode units only after the core units constituting the core means are preheated to a certain temperature or above by an additional heating means for lowering sufficiently the value of silicon resistivity. As disclosed in U.S. Pat. Nos. 4,179,530 (1979) and 5,895,594 (1999), preheating the core means for preparing a polycrystalline silicon rod requires a separate, additional preheating means and a complicated procedure.

Meanwhile, U.S. Pat. Nos. 3,941,900 (1976) and 4,215,154 (1990) disclose a technical solution to apply a direct electrical resistive heating to a core means starting from room temperature using a properly constructed electric power supply system, instead of preheating the high-purity silicon core element with a separate, additional preheating means. However, this method also has drawbacks that such an electric power supply circuit and system is highly sophisticated and costly, and requires very complicated and precise operation and control.

Unlike those methods by which the core means is preheated by a separate preheating means or is heated directly at room temperature by resistive heating using a sophisticated power supply system, incorporating a high concentration of n- or p-type dopant artificially in the silicon core element to greatly lower the resistivity enables to electrically heat up the core means directly at room temperature with high-voltage electricity. After being heated up to a predetermined temperature range, the core means can be easily heated as required with low-voltage and high-current electricity. This method has a drawback that it requires a complicated electric power supply means and a precise operation over a wide range of voltage and current.

On the other hand, if the core element is made of a non-silicon resistive material such as a metal or a carbon-based material with a resistivity value much lower than that of silicon, a silicon deposition output formed on an individual core unit can be contaminated by the impurity components generated and diffused from the core element made of a non-silicon material. However, there is an advantage that, by supplying a low-voltage electricity, the core means can be easily heated up by a resistive heating from room temperature over a deposition reaction temperature without a separate, additional preheating step. According to U.S. Pat. Nos. 5,277,934 (1994) and 5,284,640 (1994), tungsten or tantalum can be used as the core element instead of silicon. Meanwhile, U.S. Pat. No. 5,237,454 (1994) illustrates a core element made of molybdenum, tungsten or zirconium instead of high-purity silicon material.

The non-silicon core means made of a resistive material as described above can be prepared conveniently and cost-effectively. However, the deposition output obtained by silicon deposition cannot avoid being contaminated by the impurity components contained in the non-silicon core element for each of the core units constituting the core means. Thus it is difficult to apply the above method of using a non-silicon core means to a commercial production of a high-purity polycrystalline silicon rod because the purity requirement on the semiconductor-grade quality has recently become further stringent. Such a fundamental problem has also been confirmed in the prior art, as described in the above reference document (1990) of O'Mara et al. In the event a wire-type non-silicon, metallic core unit is used for the core means instead of the silicon-based core means, there is an advantage that a silicon rod product can be obtained rather conveniently. However, this method also has several disadvantages: first, when the silicon rod is finally formed as required, the deposition output and the core means included in the silicon rod should be separated with each other for the deposition output to be collected as silicon product; secondly, the deposition output formed through the silicon deposition process at a high-temperature should probably be contaminated by the impurity components out of the metallic core element.

To prepare high-purity polycrystalline silicon at a reasonable cost based on the bell-jar deposition process without any difficulties in the preheating of the silicon core means, it is worthwhile to apply a non-silicon, resistive material for the core element by solving the problems due to the replacement of the core material; the problems include a possibly difficult step for separating the core means out of the silicon rod output for collecting the silicon deposition output as product as well as a probable product contamination by the metallic impurity components out of the non-silicon core material. However, despite of the importance of the preheating of the core means, a simple, cost-effective solution has not been available to overcome those problems arising in applying the non-silicon core means.

As described above, to develop an improved method and means in preheating the core means in the bell-jar type reactor is an important technical issue for commercial bulk production of polycrystalline silicon in the form of a rod. The technical solutions required for the improvement should reduce investment costs for an electric power supply and control system and a process for preparing and machining the core means, allow an easy operation and control of the deposition reactor, enhance the reactor productivity, and ultimately lower the manufacturing cost.

DISCLOSURE OF THE INVENTION

Accordingly, an object of the present invention is to provide a method and a means for eliminating or reducing any factors that may negatively affect the investment costs for the deposition process equipment, the process operation and control, the reactor productivity and the manufacturing cost in terms of the preheating of the core means.

Another object of the present invention is, for construction and use of a commercial-scale process for preparing polycrystalline silicon in a rod shape, to electrically and easily heat the second core means made of silicon by: (a) installing a first core means made of a resistive material together with a second core means made of silicon material in an inner space of a deposition reactor; (b) electrically heating the first core means and pre-heating the second core by the first core means which is electrically heated; and then (c) electrically heating the preheated second core means.

A further object of the present invention is to solve problems encountered in preheating the core means, without lowering the production capacity of the deposition reactor, by forming a deposition output in an outward direction of the first and second core means with the first core means being served as a preheater for the second core means.

A still further object of the present invention is to provide a method and a means which can solve problems encountered in preheating a core means made of high-purity silicon, and can also be exercised in an existing, conventional deposition reactor for preparing rod-shaped polycrystalline silicon.

A still further object of the present invention is to provide a structure of the deposition reactor, a method and a means for operating the deposition reactor which can yield simultaneously two-grades of polycrystalline silicon products to be used for semiconductor devices and solar cells, respectively.

A still further object of the present invention is to provide a method and a means which can minimize the contamination of the deposition output enlarged by silicon deposition in an outward, radial direction of the first core means, which consists of and represents a plurality of core units whose respective element (i.e., core element) is made of a material other than a high-purity silicon and thus can generate impurity components as the source of the output contamination.

In order to achieve the aforementioned objects, the present invention provides a method for preparing a polycrystalline silicon rod using a mixed core means comprising: installing a first core means made of a resistive material together with a second core means made of a silicon material in an inner space of the deposition reactor; electrically heating the first core means and preheating the second core means by the first core means which is electrically heated; electrically heating the preheated second core means; and supplying a reaction gas into the inner space in a state where the first core means and the second core means are electrically heated for silicon deposition.

Optionally, in the step of electrically heating the preheated second core means, the entire second core means is electrically heated simultaneously or the second core means is divided into a plurality of second core groups which start to be electrically heated in groups at different starting times.

In a preferred embodiment, in the step of pre-heating the second core means, the second core means is pre-heated to a temperature in the range of 350-1,000° C. with the first core means being electrically heated to a temperature in the range of 400-3,000° C.

Optionally, in the step of pre-heating the second core means, the second core means is preheated in the inner space at a pressure in the range of 1-20 bar absolute under an atmosphere selected from the group consisting of hydrogen, nitrogen, argon, helium and a mixture thereof.

In a preferred embodiment, the reaction gas is supplied for a silicon deposition reaction, by which a deposition output is formed outwardly on the first core means and/or the second core means with a first deposition output and/or a second deposition output being formed thereby, respectively, at a reaction pressure and a reaction temperature.

In a preferred embodiment, the reaction gas contains at least one silicon-containing component selected from the group consisting of monosilane ($SiH_4$), dichlorosilane ($SiH_2Cl_2$), trichlorosilane ($SiHCl_3$), silicon tetrachloride ($SiCl_4$) and a mixture thereof.

Optionally, the reaction gas further contains at least one gas component selected from the group consisting of hydrogen, nitrogen, argon, helium, hydrogen chloride, and a mixture thereof.

In a preferred embodiment, the silicon deposition occurs in the inner space at a reaction pressure in the range of 1-20 bar absolute and a reaction temperature in the range of 650-1,300° C. based on the surface temperature of the first deposition output and/or the second deposition output.

Optionally, a solar-grade polycrystalline silicon to be used for solar cells is formed in the first deposition output, and an electronic-grade polycrystalline silicon to be used for semiconductor devices is formed in the second deposition output.

The present invention relates to an apparatus for preparing the polycrystalline silicon rod using a mixed core means and comprising a deposition reactor in which a silicon deposition reaction is carried out, characterized in that the deposition reactor has a sealed inner space formed therein by a base unit and a shell and comprises a gas supply means for supplying a reaction gas into the inner space, a gas outlet means for discharging an off-gas from the inner space and an electrical heating means required for the silicon deposition reaction; the electrical heating means consists of an electrode means and a core means; the core means is divided into a first core means made of a resistive material and a second core means made of a silicon material; and the electrode means is divided into a first electrode means and a second electrode means, which are connected to the first core means and the second core means, respectively, and are electrically independent from each other.

In a preferred embodiment, the first electrode means and/or the second electrode means are/is installed on the base unit.

Optionally, the first electrode means is divided into one or a plurality of first electrode groups and the second electrode means is divided into one or a plurality of second electrode groups, with electric powers being independently supplied to the respective electrode groups.

In a preferred embodiment, the first electrode means is constructed such that an electric power required for heating the first core means is independently supplied from a first electric power supply source through a first electric power transmitting means, and the second electrode means is constructed such that an electric power required for heating the second core means is independently supplied from a second electric power supply source through a second electric power transmitting means.

Optionally, the first electric power supply source and the second electric power supply source are constituted separately as independent electric power converting systems or constituted as one integrated electric power converting system.

Optionally, the first core means comprised in one or a plurality of deposition reactors are electrically interconnected with each other by the first electric power supply source.

Optionally, the second core means comprised in one or a plurality of deposition reactors are electrically connected to each other by the second electric power supply source.

In a preferred embodiment, the first core means or the second core means have a shape selected from the group consisting of a rod, a wire, a filament, a bar, a strip and a ribbon having a cross-sectional shape of a circle, an oval or a polygon, and of a conduit, a tube, a cylinder, and a duct having a cross-sectional shape of a concentric circle, a concentric oval or a concentric polygon.

In the preferred embodiment, wherein the resistive material is a metal or an alloy comprising at least one metal element selected from the group consisting of tungsten (W), rhenium (Re), osmium (Os), tantalum (Ta), molybdenum (Mo), niobium (Nb), iridium (Ir), ruthenium (Ru), technetium (Tc), hafnium (Hf), rhodium (Rh), vanadium (V), chromium (Cr), zirconium (Zr), platinum (Pt), thorium (Th), lanthanum (La), titanium (Ti), lutetium (Lu), yttrium (Y), ferrum (Fe), nickel (Ni), aluminum (Al) and a mixture thereof.

Optionally, the resistive material is a ceramic metal material containing at least one component selected from the group consisting of molybdenum silicide (Mo—Si), lanthanum chromium oxide (La—Cr—O), zirconia and a mixture thereof.

Optionally, wherein the resistive material is a carbon-based material comprising at least one component selected from the group consisting of amorphous carbon, graphite, silicon carbide (SiC) and a mixture thereof.

In a preferred embodiment, the silicon material is selected from the group consisting of intrinsic polycrystalline silicon, intrinsic single crystalline silicon, doped silicon and a mixture thereof.

Also, the first core means is constituted by forming one or a plurality of separation layer(s) made of a barrier component on the surface of a first core element made of a resistive material.

Here, the number of the separation layer(s) is in the range of 1 to 5, and thus the first core means may consist of one to five kinds of the separation layer(s).

In a preferred embodiment, a barrier component constituting each layer of the separation layer(s) is selected from the group consisting of intrinsic silicon nitride, silicon oxide, silicon carbide, silicon oxynitride and a mixture thereof.

Here, the barrier component constituting each layer of the separation layer(s) is selected from a nitride, an oxide, a silicide, a carbide, an oxynitride or an oxysilicide comprising at least one metal element selected from the group consisting of tungsten (W), rhenium (Re), osmium (Os), tantalum (Ta), molybdenum (Mo), niobium (Nb), iridium (Ir), ruthenium (Ru), technetium (Tc), hafnium (Hf), rhodium (Rh), vanadium (V), chromium (Cr), zirconium (Zr), platinum (Pt), thorium (Th), lanthanum (La), titanium (Ti), lutetium (Lu), yttrium (Y), and a mixture thereof.

Optionally, the overall thickness of the separation layer(s) formed on the first core element of the first core means is in the range of 10 nm to 20 mm.

Optionally, the first core units constituting the first core means is heat-treated at a temperature in the range of 400-3,000° C. regardless of the formation of the separation layer(s), and the heat treatment can be carried out by being electrically heated in the above-mentioned deposition reactor or in a conventional deposition reactor.

In the first core means, however, a silicon layer is formed on the separation layer, with the thickness of the silicon layer being in the range of 1 μm-10 mm and silicon being selected as the barrier component.

At this time, the first core means is constructed by surrounding the surface of the first core element with a plurality of separation layer constituting units made of the barrier component.

On the other hand, the separation layer is formed by coating a barrier component on the surface of the first core element.

Optionally, part of the separation layer(s) or the entire separation layer(s) can be formed in the above-mentioned deposition reactor or in a conventional deposition reactor.

BRIEF DESCRIPTION OF THE DRAWINGS

The above objects, other features and advantages of the present invention will become more apparent by describing the preferred embodiments thereof with reference to the accompanying drawings, in which:

FIGS. 8-12 are cross-sectional views (a) and longitudinal sectional views (b) showing the states that a silicon deposition output is formed outwardly on the surface of the first core unit constituted by forming a separation layer on the surface of a first core element according to the present invention, wherein:

FIG. 8 shows illustrative views schematically showing a cross-section (a) and a longitudinal section (b) of the silicon rod in the course of forming the silicon deposition output outwardly on the surface of the first core unit constituted by forming one separation layer on the surface of the rod-shaped first core element having a circular cross-section;

FIG. 9 shows illustrative views schematically showing a cross-section (a) and a longitudinal section (b) of the silicon rod in the process of forming the silicon deposition output outwardly on the surface of the first core unit constituted by forming two kinds of the separation layers on the surface of the rod-shaped first core element having a circular cross-section;

FIG. 10 shows illustrative views schematically showing a cross-section (a) and a longitudinal section (b) of the silicon rod in the course of forming the silicon deposition output outwardly on the surface of the first core unit constituted by forming two kinds of the separation layers on the surface of the conduit-shaped or tube-shaped first core element having a hollow, concentric rectangular cross-section;

FIG. 11 shows illustrative views schematically showing a cross-section (a) and a longitudinal section (b) of the silicon rod in the process of forming the silicon deposition output outwardly on the surface of the first core unit constituted by forming three kinds of the separation layers on the surface of the rod-shaped first core element having a circular cross-section; and FIG. 12 shows illustrative views schematically showing a cross-section (a) and a longitudinal section (b) of the silicon rod in the course of forming the silicon deposition output outwardly on the surface of the first core unit constituted by forming two different kinds of the separation layers on the surface of the strip- (or ribbon-) shaped first core element having a rectangular cross-section.

BEST MODES FOR CARRYING OUT THE INVENTION

Reference will now be made in detail to a preferred embodiment of the present invention, examples of which are illustrated in the accompanying drawings.

The present invention can be applied to all the deposition reactors used for preparing polycrystalline silicon in the form of a rod regardless of a shape and structure of the deposition reactor such as bell-jar type, a tube type or a chamber-type. Since the bell-jar type deposition reactor which is also referred to as the Siemens reactor has most widely been used for commercial purpose, the present invention will be described with reference to such bell-jar type deposition reactor (hereinafter, referred to as "bell-jar type reactor") in this specification.

Figure 1:
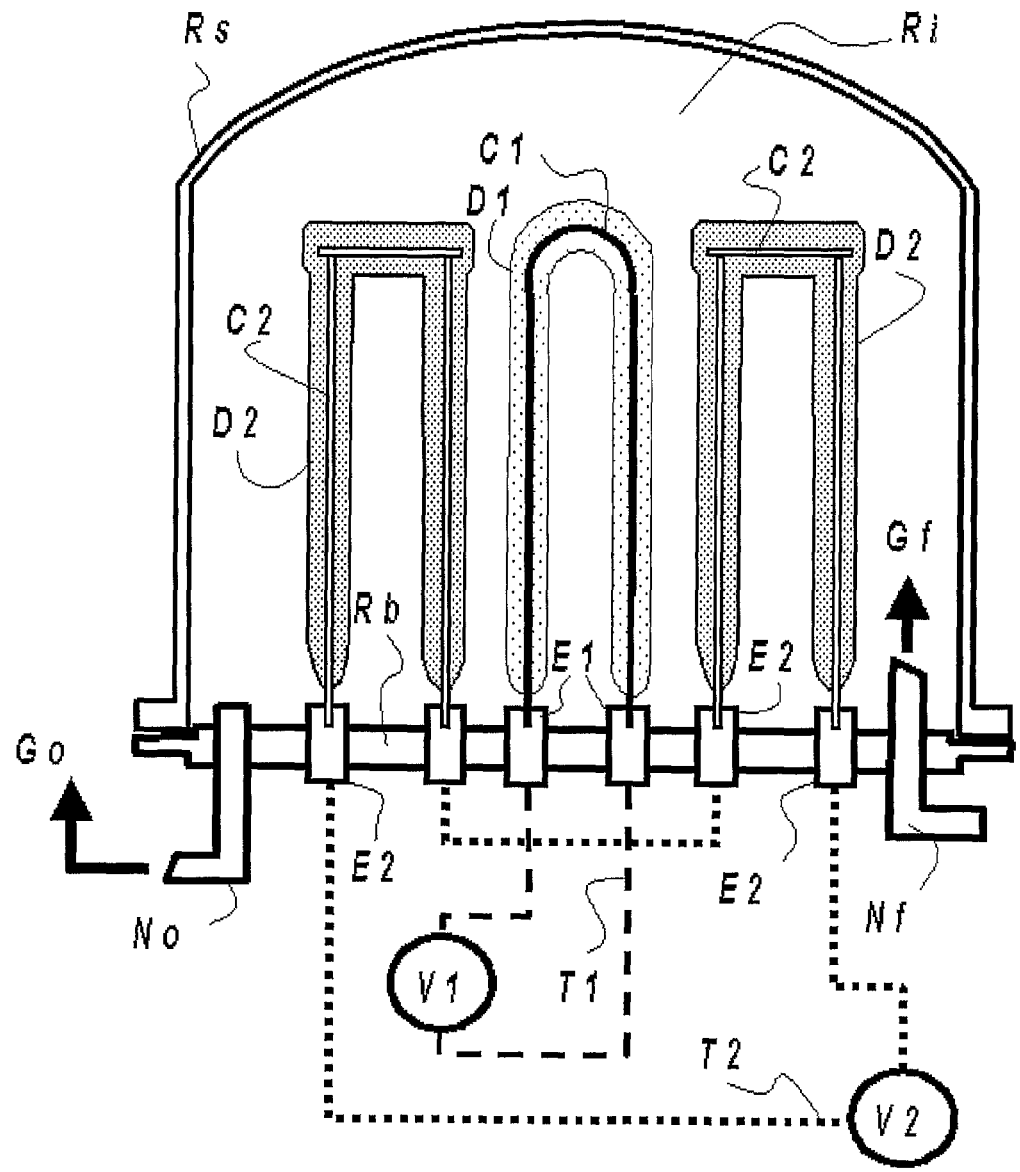
FIG. 1 is an illustrative schematic view showing an example of an inner space of a deposition reactor for preparing rod-shaped polycrystalline silicon according to the present invention.

As shown in FIG. 1, the deposition reactor comprises a sealed inner space Ri, formed by a shell Rs and a base unit Rb, and core means C1 and C2 consisting of one core unit or a plurality of core units, installed in the inner space Ri.

The core units, mechanically fixed on respective electrode units, are electrically connected to each other by electrode units E1 and E2. Electric power is supplied to the electrode units E1 and E2 through electric power transmitting means T1 and T2 from the electric power supply sources V1 and V2 installed outside of the shell Rs and the base unit Rb.

In a small, laboratory-scale deposition reactor, a core means consists of only one or a small number of core units, and each core unit is connected to a pair of electrode units at its both ends. Otherwise, in a deposition reactor used for a large-scale commercial production of polycrystalline silicon, the core means consists of several tens to several hundreds of core units, which have conventionally been the same with each other in material or shape.

The keywords and descriptions in the present invention are based on the following definitions: the "core means" indicates a group of one or a plurality of "core units" constituting a substrate that is the starting point of the formation of the silicon deposition output caused by a deposition reaction; and each core unit is composed of, constituted by, or fabricated from the material to be represented by the "core element".

And, since a plurality of identically grouped core units can be connected electrically to each other in series and/or in parallel, and the silicon deposition can occur almost in the same manner on the identically grouped core units, the operation method and a phenomenon or a characteristic observed on an individual core unit may be collectively described in terms of a "core means" representing a group of the core units which are identically grouped in the present invention.

Once the core means C1 and C2 are heated above the temperature required for silicon deposition and the reaction gas Gf is supplied into the inner space Ri, the silicon deposition initially starts on surfaces of the core means C1 and C2. Then, silicon deposition outputs D1, D2 are formed in an outward direction of the core means C1 and C2, respectively, with polycrystalline silicon being ultimately prepared in the form of a rod. In this process, each core unit behaves as a structural frame of the respective unit of the polycrystalline silicon rod to be obtained by the reactor operation.

Unlike the conventional manner in which a plurality of core means C1, C2 installed in an inner space of the deposition reactor is made of one kind of material selected from silicon material or non-silicon material, a special feature of the present invention is that the core means are composed of two or more different kinds of core means in constituting an electrical heating means within the deposition reactor, together with the electrode units; i.e., there exist at least two kinds of core means such as the first core means C1 representing a group of the first core units consisting respectively of a core element made of a non-silicon, resistive material, and the second core means C2 representing a group of the second core units consisting respectively of a core element made of silicon-based material.

In the present invention, a particular importance is given to a different grouping of the core means, for example, C1 and C2, on the basis of the material difference between the core elements constituting the respective core units. According to the grouping in the present invention, the non-silicon, resistive core material constituting the first core unit is electrically heated initially, and what naturally follows is the preheating of one or a plurality of the silicon material-based second core units installed around a previously electrically heated first core unit, where the preheating occurs mainly by radiation heat transfer. Following the naturally occurring preheating step, the resistivity of silicon itself becomes sufficiently lowered with the increase of temperature such that electrical (resistive) heating of the second core units can be started with moderate electrical conditions, hence allowing its rapid heat-up.

Meanwhile, two or more different kinds of non-silicon, resistive materials with different electrical properties can also be applied to the present invention. Then the resistive material-based core means can further be divided into a plurality of the first core means; for example, the first core means can be divided into two groups of core means, i.e., 1$a$ core means and 1$b$ core means, when two different resistive materials are applied for constructing the non-silicon core means. In this case, after supplying electricity to heat simultaneously or sequentially the 1$a$ core means and the 1$b$ core means, a plurality of the silicon-based second core units installed around the electrically heated 1$a$ core means and 1$b$ core means should be naturally preheated mainly through radiation heat transfer mechanism. By the preheating step as described above, the resitivity of silicon becomes lowered sufficiently so that the second core means could be electrically heated easily and rapidly.

Hereinafter the present invention will be described in more detail on the basis of a representative specific case in which the first core means C1 representing the overall group of the first core units consisting of the respective core elements made of a non-silicon, resistive material and the second core means C2 representing the overall group of the second core units consisting of the respective core elements made of high-purity silicon material are installed together in the inner space Ri of the deposition reactor. Here, the high-purity silicon material means an intrinsic silicon or a doped silicon containing an artificially added dopant, in either of which the concentration of harmful impurity components is controlled to be less than an allowable range.

The core units constituting the first and second core means, C1 and C2, are electrically connected and mechanically fixed to the first and second electrode units constituting the first and second core means, E1 and E2, respectively, with an individual core unit being connected to a pair of electrode units.

In the present invention, the resistive material-based first core means C1 and the corresponding first electrode means E1 constitutes the first electrical heating means in the deposition reactor. Thus, the first core means can be electrically heated easily and rapidly from the room temperature to a required temperature for preheating the second core means by introducing an electric current into them at a moderate potential difference. Here the electric power is supplied from the first electric power supply source V1, installed outside the deposition reactor, to the first electrode means E1 via the first electric power transmitting means T1.

On the other hand, the silicon-based second core means C2 and the corresponding second electrode means E1 constitutes the second electrical heating means in the deposition reactor. Here the electric power is supplied from the second electric power supply source V2, installed outside the deposition reactor, to the second electrode means E2 via the second electric power transmitting means T2.

At room temperature, the resistivity of high-purity silicon is so high that the material cannot be electrically heated unless an extraordinarily high potential difference is applied at its both ends. This causes a great difficulty in electrically heating the second core means C2 consisting of a plurality of the second core units using a common electric power supply source without preheating the second core means above a certain temperature range. For starting the heating operation of the deposition reactor from room temperature according to the present invention, it is required to electrically heat the first core means C1 in advance without supplying electric power to the second core means C2. Being located near and around the first core means C1 electrically heated in advance, the second core means C2 becomes subject to natural preheating and to subsequent rise in temperature without electric supply.

On the other hand, there can be an alternative method for preheating the mixed core means C1 and C2. After being heated sufficiently to a high temperature, a high-temperature inert gas without containing a reaction gas or silicon-containing component may be supplied into the inner space Ri of the deposition reactor through a gas supply means Nf or an additional gas supply means for heating up the first core means C1 and/or the second core means C2. However, by utilizing such a high-temperature inert gas alone as a heating medium without electricity, it is practically impossible to heat up within an allowable time period the mixed core means, especially the second core means, installed in a large-volume commercial reactor to a predetermined preheating temperature in the range of from about 350-400° C., at which the resistivity of silicon becomes sufficiently lowered below 2-5 ohm-cm, to 1,000° C., at which silicon exhibits a sufficiently conductive, resistive property.

As suggested in the present invention, if the second core means C2 is preheated to a temperature in the range of about 350-1,000° C. through the prior electrical heating of the first core means C1, an electric current can flow in the second core means C2 without much difficulty, thus enabling the start of an electrical resistive heating of the second core means C2. Here, the higher the preheating temperature is, the easier the second core means becomes electrically heated at a lower potential difference (voltage).

In the process of preheating the second core means C2 through the prior electrical heating of the first core means C1 as described above, no special constraint is imposed on pressure in the inner space. Instead at a high vacuum requiring much more sophisticated set up, the preheating can be executed at a normal pressure. Otherwise, the pressure may be selected in advance in the range of 1-20 bar absolute where the operation of silicon deposition will be executed. And it is preferred to execute the preheating of the second core means C2 under an atmosphere selected from the group consisting of hydrogen, nitrogen, argon, helium and a mixture thereof. The gas selected for maintaining the atmosphere may be introduced into the inner space through the gas supply means Nf or an additional gas supply means. In this case, the gas flow rate may preferably be set in such a range that the core means C1, C2 not be cooled down.

Considering that the higher the hotter temperature is, the more the radiation heat transfer between two solid surfaces with different temperatures, the preheating of the second core means C2 is initiated and maintained by radiation heat transfer from the first core means C1 electrically heated in advance, and then temperature rise in the second core means becomes also influenced by radiation between the adjacent units themselves of the second core means C2 with the lapse of the preheating process.

When the temperature T(C1) of the first core means C1 is controlled high enough to achieve the temperature T(C2) of the preheated second core means C2 to be in the range of 350-1,000° C., it is desirable to select and adjust an appropriate temperature difference [ΔT=T(C1)−T(C2)] between the two core means by controlling an electrical heating of the first core means (C1), considering that an electrical heating of the second core means C2 can be started more easily at a higher preheating temperature T(C2).

In the present invention, it is preferred that the first core means C1 is electrically heated in the range of 400-3,000° C. during the process of preheating the second core means C2. During the process the temperature difference ΔT between the first core means C1 and the second core means C2 is desirably maintained in the range of 50-2,650° C.

If ΔT<50° C. and T(C1)<400° C., it is practically impossible to preheat the second core means C2 to a temperature of T(C2)=350° C. On the other hand, once a temperature T(C1) of the first core means is maintained above 3,000° C. in order to increase the rate of radiation heating at an initial stage of the preheating process with ΔT being above 2,700° C., the first core means C1 itself may be near its melting point and the silicon material-based second core means C2, positioned adjacent to and around the first core means, could highly possibly be melted down.

It does not matter if the second core means C2 is preheated to the range of about 400-900° C. for the resistivity of silicon to fall into a range of about 0.03-2 ohm-cm. The second core means C2 may more preferably be preheated to a temperature in the range of 750-850° C., if accessible, at which the resistivity of silicon becomes less than about 0.1 ohm-cm with its conductive characteristic being more apparent. The preheating conditions as described above prevent a risk of melting of the silicon core element, reduce the time required for the preheating process, and then allow a start of the electrical heating of the second core means C2 at a moderate voltage. Such preheating conditions are obtainable by a prior electrical heating of the first core means C1 to a temperature preferably in the range of 500-2,500° C., and more preferably in the range of 800-2,000° C.

In the preheating process according to the present invention, the surface temperatures of the electrically heated first core means C1 and/or the preheated second core means C2 may somehow be maintained to be a little higher than the reaction temperature for silicon deposition without causing a serious problem. For example, in a case that reaction gas Gf composed of monosilane ($SiH_4$) as a silicon-containing component is used as a raw material for the deposition reaction at a temperature is in the range of about 650-800° C., the second core means C2 can be preheated to a temperature somehow higher than a predetermined reaction temperature and its electrical heating can be started thereafter without a problem. Further, it is not difficult to control the electric power supplied to both of the two core means C1, C2 in parallel with the supply of the reaction gas with the reaction temperature being maintained as required.

After preheating the second core means C2 to a temperature T(C2) in the range of 350-1,000° C. for sufficiently lowering the resistivity of silicon as described above, electricity can then be supplied to them at a moderate potential difference from the second electric power supply source V2 through the second electrode means E2. The second core means C2 thereby becomes electrically heated so that its temperature could be regulated at a reaction temperature Tr representing an allowable temperature range predetermined for maintaining the silicon deposition reaction as required.

Here, several factors may affect the electrical heating of the second core means C2 which electrically consists of interconnections of the second core units in series and/or parallel circuit. Besides an electrical characteristic such as the resistivity of silicon, the configuration of the electrical circuit and the assembly details of the deposition reactor, such as the number of the second core units constituting the second core means C2, the contact resistance between an individual core unit and its corresponding electrode unit, etc., determine how the electrical heating should be performed for maintaining and controlling the temperature of the second core means C2 at the level of Tr.

On this account, in order to electrically heat the second core means C2 in an allowable range of voltage and current, it is desirable to predetermine and optimize detailed conditions for heating the mixed core means following the preliminary experimental tests required: the final preheating temperature of the second core means C2 may be optimized in the range of 350-1,000° C.; the temperature of the first core means C1 electrically heated in advance may be selected or changed with time in the range of 400-1,000° C.; and the temperature difference ΔT between the two core means may be maintained constant or changed with time in an optimal way by at least about 50° C. or higher.

When the temperature T(C2) of the second core means C2 increases rapidly by supplying electricity to it for electrical heating after completing the preheating process, the first electric power supply source V1 and the second power electric power supply source V2 are controlled to supply electricity as required to the corresponding core means C1 and C2 so that the reaction temperature Tr can be maintained constant or changed with time. The value of Tr may be predetermined in the range of 650-1,300° C. according to detailed deposition conditions such as reaction gas composition and operation procedure.

In the present invention, the first core means C1 consists of one or a plurality of first core units and the second core means C2 consists of one or a plurality of second core units, where each of the core units is connected to a pair of electrode units. An electric power supply system for the reactor system may be constructed in the manner that the core units represented by a core means are interconnected to each other in series and/or parallel circuits or a core unit be configured as an independent electrical unit. For example, FIG. 1 illustrates an electric power supply system, in which the first core means C1 consists of one first core unit and is electrically connected to the first electric power supply source V1 via the first electrode means E1, i.e., a pair of the first electrode units E1, while the second core means C2 consists of two second core units connected to each other in series and is electrically connected to the second electric power supply source V2 via the second electrode means E2, i.e., two pairs of the second electrode units E2.

If the present invention is applied to the deposition reactor shown in FIG. 1, the first core means C1 made of a resistive material and the second core means C2 made of silicon material are installed together in the inner space Ri of the deposition reactor, where the first core means C1 is electrically heated first and the second core means C2 is preheated by the radiation heat transfer from the electrically heated first core means C1. After completing the preheating process, the preheated second core means C2 starts to be electrically heated by the supply of electricity, and then preparation of a polycrystalline silicon rod can be initiated through a supply of reaction gas Gf.

Unlike the example of FIG. 1 consisting of a small number of core units, there is a need to consider the fact that the core means consists of several tens to hundreds of the core units, in general, when the present invention is applied to bulk production of the rod-shaped polycrystalline silicon in commercial scale. In a large-sized reactor shell Rs where a large number of core units can be installed, a considerable temperature difference may possibly occur between the core units according to the location of their installation, the construction of the electric circuit for power supply and the operation conditions. The problem of temperature difference between the core units can occur not only in the process of silicon deposition but also in the whole process from the initial electrical heating of the first core means C1 to the additional electrical heating of the preheated second core means. Accordingly, there is a need to consider the possible existence of such a temperature difference in the design and operation of the deposition reactor.

When the first core means C1 consists of a small number of the first core units, the electrical heating of the whole first core means C1 can be started simultaneously. Otherwise, when a large number of the first core units are installed, the first core means C1 may be further divided into a plurality of the first core groups such that the respective first core groups start to be electrically heated at different times predetermined according to the group. It is thereby possible to reduce or prevent a problem due to a considerable temperature difference between the first core units in the initial electrical heating and preheating processes.

When the second core means C2 consists of a large number of the second core units, a considerable temperature difference between the second core units may also be observed. Then, some differences may occur in the degree of preheating among the second core units. Differently from the other second core units preheated sufficiently as required, some of the second core units which are not preheated enough may yield no apparent current therein in response to a predetermined voltage imposed upon the corresponding pair of the second electrode units. This deters the initiation of the electrical heating of the preheated second core means, requiring an extension of the preheating process.

Also, when the second core means C2 consists of a small number of the second core units, the electrical heating of the whole second core means C2 after the preheating process can be started simultaneously. Otherwise, when a large number of the second core units are installed, the second core means C2 may be further divided into a plurality of the second core groups such that the respective second core groups start to be electrically heated at different times predetermined according to the group.

In the present invention the supply of electricity to a number of the preheated second core units can be arranged to start in groups such that the electrical heating of the preheated second core means can proceed individually and consecutively on the basis of the second core groups. Then, the preheating of a second core group, which are so located as not to be preheated efficiently by the surrounding, electrically heated first core units, can be effectively accelerated by an additional radiation heat transfer from an another second core group which began to be electrically heated earlier following its faster achievement of preheating. Such an accelerated preheating process based on the individual and consecutive start of the second core units in groups should lead to a faster start of the electrical heating of the whole core means.

Once an electrical heating of the silicon-based second core unit is initiated after its resistivity is sufficiently lowered by the preheating process, its temperature rapidly rises to reach a deposition reaction temperature range due to its small cross-sectional area. Therefore, in the present invention, there exists a negligible time interval between the starting times when the respective second groups begin to be electrically heated.

For differentiating the times for individual electrical heating operation and control of the first core means C1 and/or the second core means C2 by dividing the respective core units in different groups, the following arrangements may be accompanied: the electric power supply system needs to be composed of a number of subdivided systems corresponding to the grouping of the core means allowing an individual switching and/or regulation of power supply in groups. Considering an additional cost for the subdivided power supply system, it is desirable not to divide the core means unnecessarily into a large number of core groups.

The core units and the corresponding electrode units can be arranged in a regular array; the co-planar locations of the core units can have a bilateral symmetry and/or a vertical symmetry, as illustrated in FIGS. 2 to 7. Such arrangement can influence the preheating of the second core means C2 remarkably. It is thus important to take the number of those core groups and the spatial arrangement of them into consideration for construction of the deposition reactor as well as the electric power supply system according to the present invention.

When the present invention is applied to an existing, conventional deposition reactor comprising an additional preheating means for preheating the core means made of silicon material, it is desirable to determine the number and the arrangement of the first core units constituting the first core means C1 after considering the possible application of the additional preheating means in the process of preheating the second core means C2.

After installing the first and second core means C1, C2 in the inner space Ri of the deposition reactor as described above, it is desirable to carry out the process of preheating the second means C2, which is mainly contributed by the previously started electrical heating of the first core means C1, under an atmosphere selected from the group consisting of hydrogen, nitrogen, argon and helium. However, it is also permissible to supply the reaction gas Gf to the inner space Ri during the preheating process for silicon deposition on the surface(s) of the first core means C1 and/or the second core means C2. For example, once the second core means C2 is considerably preheated to a temperature T(C2) of approximately above 500-600° C., the reaction gas Gf can be supplied into the inner space Ri even prior to initiating an electrical heating of the second core means C2, This means that a process of silicon deposition can possibly start even in parallel with the process of preheating the second core means C2, and the silicon deposition may begin mainly on the high-temperature surface of the first core means C1. However, if the temperature T(C2) of the second core means is still low or the reaction gas Gf is introduced into the inner space Ri without being sufficiently heated, the second core means C2 can be cooled by the injection of the reaction gas Gf, and thereby the starting time of the electrical heating of the second core means C2 may be delayed remarkably. Therefore, the starting time of silicon deposition should be determined carefully if an early start of silicon deposition is considered.

For safer and more completed operation it is preferable to start the process of silicon deposition after the initiation of an electrical heating of the second core means C2 following the process of its preheating. It is more preferable to start the silicon deposition by initiating the supply of reaction gas Gf to the inner space Ri with all the temperatures of the first and second core means C1, C2 being maintained stably within an allowable range of the reaction temperature in accordance with the corresponding adjustment of the first electric power supply source V1 and the second electric power supply source V2.

The deposition reactor by the present invention comprises an electrical heating means, which consists of the electrode means E1 and E2 and the corresponding core means C1 and C2, and is required for supplying the electric energy required for the process of silicon deposition. Here, the core means is divided into the first core means C1 made of a resistive material and the second core means C2 made of a silicon material. And, all the electrode units constituting the electrode means are divided into the first electrode units represented by the first electrode means E1 and the second electrode units represented by the second electrode means E2, both of which are connected to the first core means C1 and the second core means C2, respectively. The first and second electrode means E1 and E2 are electrically independent to each other. When the reaction gas Gf is supplied through one or a plurality of the gas supply means Nf into the deposition reactor constituted as described above, a polycrystalline silicon rod can be prepared by the silicon deposition outward on the electrically independent core means C1, C2 connected to the electrode means E1, E2, respectively.

Since the characteristics of heat transfer and heat loss of the core units constituting the first and second core means C1, C2 are somehow different from each other according to the electric properties, the physical specifications and the installation arrangement (coplanar layout) thereof, there can be observed a temperature difference between the two core means C1, C2.

In the bell-jar type deposition reactor for silicon deposition, it is more reasonable for the reaction temperature Tr to represent a practically allowable range of temperature rather than to limit a specific value of temperature. When the reaction gas Gf is supplied into the reactor for the deposition process according to the present invention, it is desirable to regulate the respective electric powers supplied independently to the first and second core means C1, C2 so as to maintain the reaction temperature Tr in such a manner that a temperature difference between the two core means C1, C2 being maintained within the range of 0-200° C.

Figure 11:
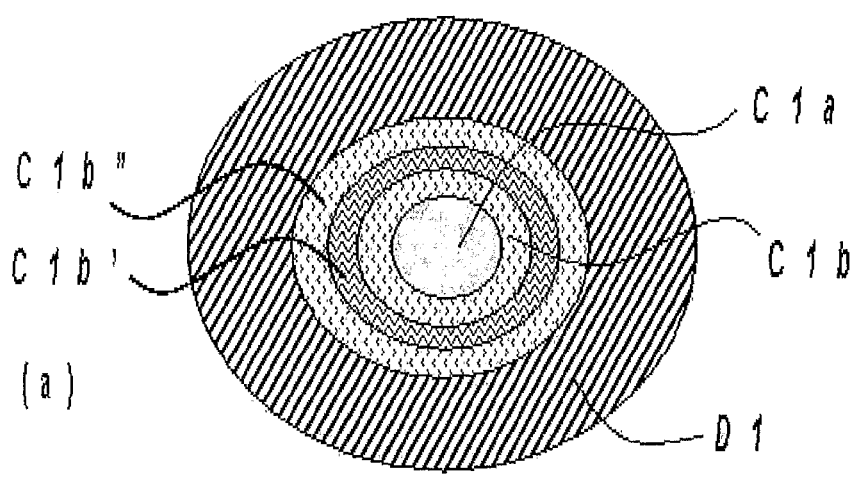
Figure 11:
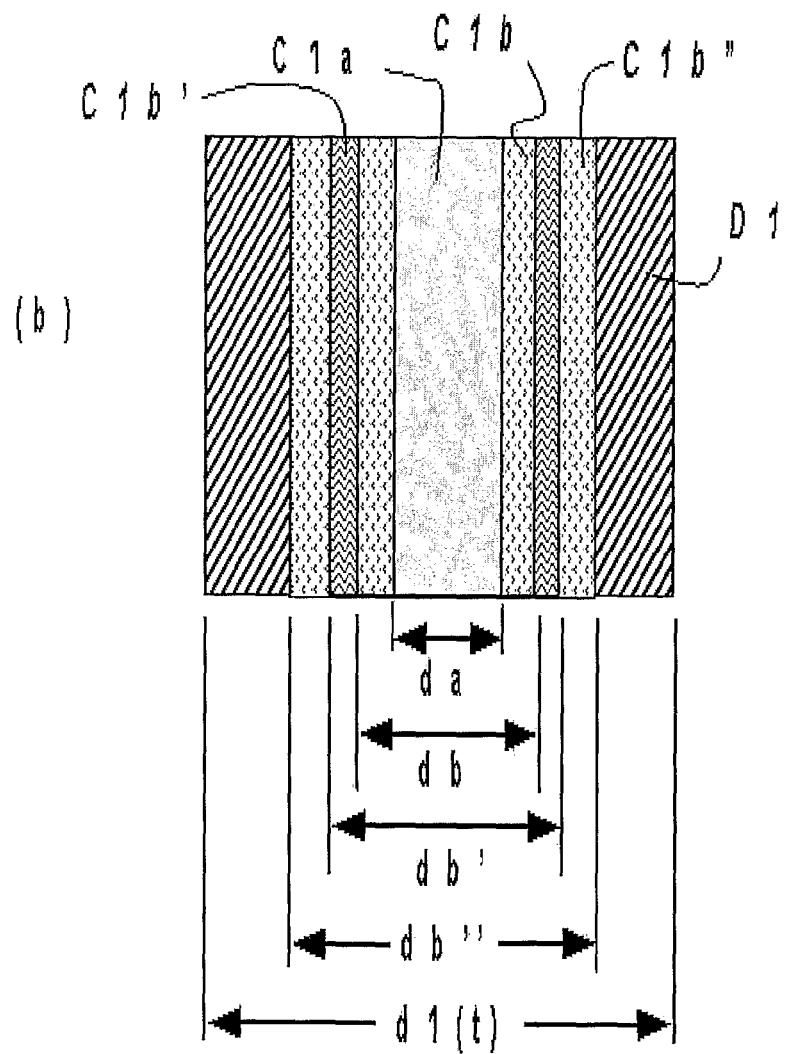
Figure 12:
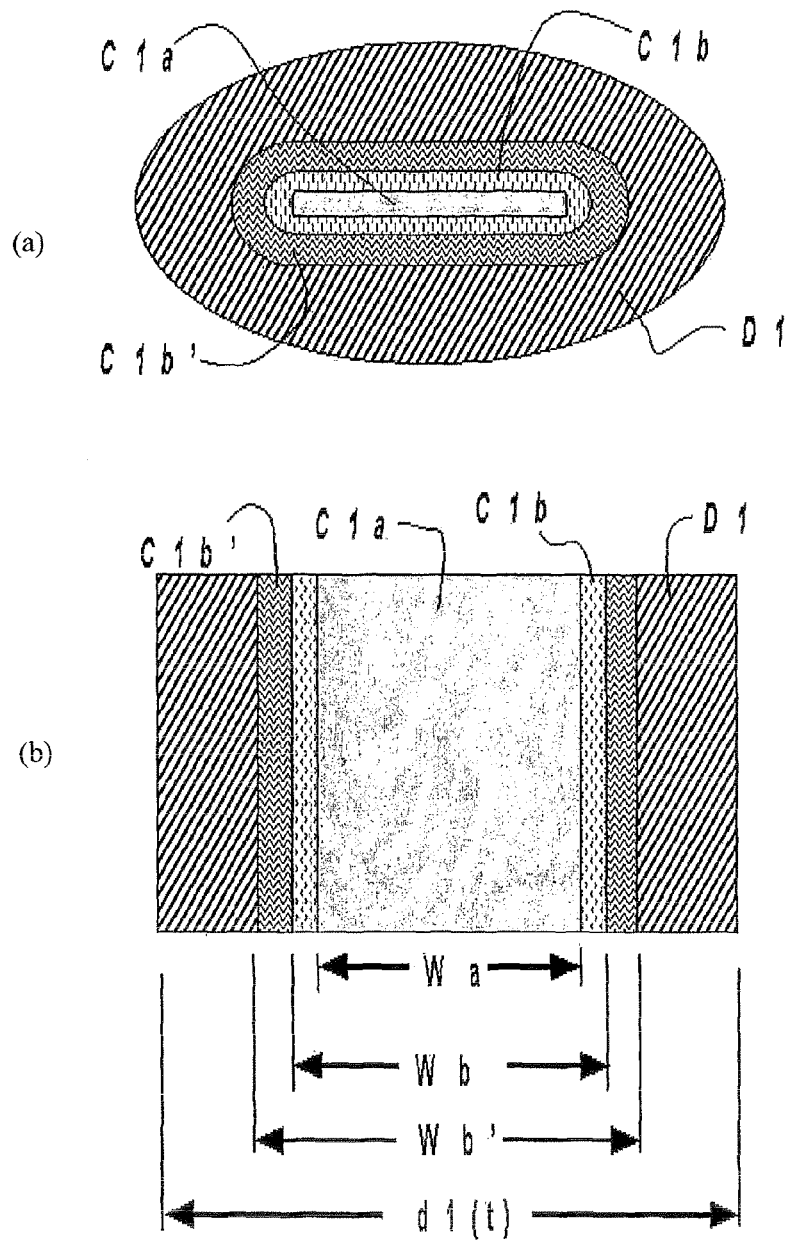
Figure 13:
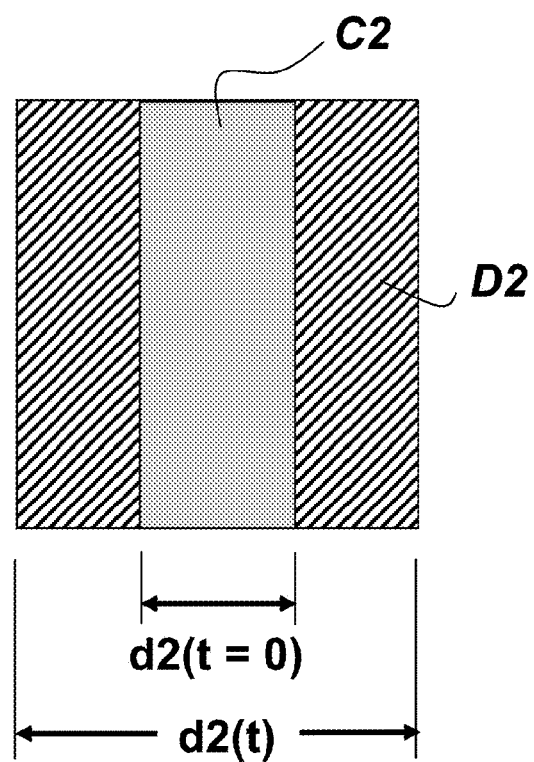
FIG. 13 shows an illustrative view showing a longitudinal section of the second silicon deposition output formed outwardly on the surface of the second core means.

In the deposition process temperature influences many factors including but not limited to: a rate of silicon deposition; a characteristic of reaction; a cross-section dimension of the deposition output formed outwardly on each core means, in other words, the maximum diameters $d1(t)$ and $d2(t)$ of the deposition outputs formed outwardly on the first and second core means, respectively (here, $d1(t)$ is shown in FIG. 8 to FIG. 12 illustrating various shapes of the longitudinal section and cross-sections of the deposition output formed outward on a first core means; and $d2(t)$ is shown in FIG. 13 for a longitudinal section of the second deposition output D2 illustrating the increase of $d2(t)$ at time t grown from $d2(t=0)$ at the start of silicon deposition on a second core means); and the rate of thickness increase. It is therefore desirable to minimize any kinds of temperature difference not only between the core units constituting an individual core means, but also between the two core means. If there exist a temperature difference of greater than 200° C. and a temperature distribution among the core units included in the first and second core means C1, C2 in the process of silicon deposition, the difference between $d1(t)$ and $d2(t)$ increases with time passage. When $d1(t)$ or $d2(t)$ of some or any one of the core units reaches a maximum allowable value, the deposition operation should be stopped although the other deposition outputs are not formed sufficiently on the remaining core unit. This problem ultimately causes a decrease in reactor productivity.

Accordingly, in the new design of a deposition reaction for carrying out the present invention more effectively, the following aspects are to be reflected: the preheating of the second core means C2 should be carried out effectively by the first core means C1 which is electrically heated in advance; and it is important to reduce as much as possible the temperature difference and the temperature distribution, which can be generated not only between the core means and but between the core units constituting an individual core means in the process of silicon deposition.

To satisfy these aspects, the core units comprising each core means should be appropriately arranged considering the specification or the characteristics of the elements constituting of the deposition reactor such as: the shell Rs, the base unit Rb; the gas supply means Gf; the gas outlet means No; a temperature measuring and controlling system, etc. Also, a spatial change with time due to the growing of the deposition output, a time-dependent pattern of gas flow within the inner space, a cooling by the heat transfer through the reactor shell Rs, and the like can influence the arrangement (spatial layout) of the core units.

In order to supply a controlled electric power duly to every core means, core group or core unit, it is important to make use of a change of voltage-current characteristics in the electric circuit to be controlled. However, since it is also important to utilize a detected temperature for controlling the electric power supply system, there is a need to design the deposition reactor such that one or a plurality of non-contact type temperature measuring means, which is commercially available, such as the pyrometer, a temperature-distribution measurement device and the like can be employed by installing at proper locations of the shell Rs and/or the base unit Rb.

Meanwhile, control parameters and procedure are normally predetermined for each of the electric power supply sources V1 and V2 in order to control the respective supplying of an electric power as required. The electric power supply sources V1, V2 supply well-controlled powers to the core means C1, C2, respectively, minimizing the temperature difference between the two core means within an allowable reaction temperature range during the operation of the deposition reactor.

The electric power supply sources V1, V2 for supplying electric powers to the corresponding core means C1, C2 through the corresponding electric power transmitting means T1, T2 can be constructed as two separate, independent electric power supply systems, V1-T1-C1 and V2-T2-C2, as illustrated in FIG. 1. On the contrary, the two electric power supply sources may possibly be integrated as a combined, single apparatus, from which electric powers are supplied independently to the core means C1, C2 through the corresponding electric power transmitting means T1, T2. In the present invention, "an independent electric power supply" means that a current or voltage can be adjusted and applied independently for each of the core means, core groups or core units, irrespective of the configuration of the electric power supply sources.

Further, for each core means, the core units and the corresponding electrode means can be electrically interconnected with each other in series and/or parallel circuits, after considering the number, the size and the electrical characteristic of the core units constituting the corresponding core means. According to the electric circuit formed for each core means, the values of voltage and current applied to an individual core unit and the resistive heating power generated therein are determined.

Following the basic characteristic of the present deposition reactor, a cross-sectional size of the deposition output, that is, $d1(t)$ and $d2(t)$, increase with the reaction time, t, of the deposition process, and differences in temperature and physical shape between the silicon deposition outputs can be observed according to an installation arrangement of the core units. Thus, in constructing and operating the electrical power supply system for the deposition reactor, it is worthwhile to consider that there may exists differences in the electrical properties between the core units, the core groups or the core means, and that the electrical properties can change with time.

In the present invention, it is permissible to select either a direct current or an alternating current as the type of electricity to be supplied to the core means C1 and C2.

The deposition reactor according to the present invention, in which a silicon deposition reaction for preparing the polycrystalline silicon in the form of a rod is carried out is, composed of: the inner space Ri formed by the base unit Rb and the shell Rb; the gas supply means Nf for supplying the reaction gas Gf to the inner space Ri; the gas outlet means No for discharging an off-gas Go from the inner space Ri; and the electrical heating means required for the silicon deposition reaction.

The overall electrical heating means consists of the electrode means and the corresponding core means divided as the first core means C1 made of a resistive material and the second core means C2 made of a silicon material. The electrode means are divided into the first electrode unit means E1 composed of the first electrode units and the second electrode means E2 composed of the second electrode units. The first and second electrode means E1 and E2 are connected to the first core means C1 and the second core means C2, respectively. Here it is remarkable that the first electrode unit E1 and the second electrode unit E2 are electrically independent from each other.

It is permissible to install the first electrode means E1, E2 on either of the shell Rs or the base unit Rb of the deposition reactor. However, since a weight (load) of the silicon rod output exerted on the corresponding core means C1, C2 and electrode means E1, E2 should increase continuously with the reaction time, it may be advantageous in a structural aspect to install the first and second electrode means E1, E2 on the base unit Rb when the shapes of the core units to be installed are simple or linear as illustrated in FIG. 1. If the shape and the structure of a group of core units are designed such that each core unit can withstand the weight of the respective silicon rod outputs, it is permissible to install the electrode units E1, E2 on either or both of the shell Rs and the base unit Rb which are equipped with a cooling means.

In the present invention, the electrode means E1, E2 behave as electrical connecting means enabling electricity to flow through the corresponding core units constituting the core means C1, C2. Here, the respective electrical powers are supplied from the electric power supply sources V1, V2, installed outside the deposition reactor shell, through the electric power transmitting means T1, T2, respectively. Details of the electricity flowing through the electrode means are determined according to the series and/or parallel circuits constructed for an individually predetermined electrical heating means.

A pair of electrode units connected to each core unit serve as the input and output terminals of the single core unit. The construction of interconnections between the electrode units or the electrical circuit structure of the whole electrode units may be determined according to the installation arrangement, i.e., spatial layout of the core means C1, C2 as well as the specifications predetermined for constructing their corresponding electric power supply systems.

Various shapes of the electrode means employed in the conventional bell-jar type reactor can be used in the present invention as they are. Each of the electrode units, represented by an electrode means, may consist of all or part of the following elements: (i) an electrode made of a metallic conductive material with a low electrical resistance by which electrical self-heating is weak; (ii) an electrical coupling unit or an electrical connecting unit which can interconnect mutually the electrode and the corresponding electric power transmitting means T1, T2 such as a cable, a bar, a tube, a shaft, a conduit, a shaped article and the like for supplying an electric power; (iii) a coupling support or a chuck made of a carbon-based material, which electrically connects the core unit to the electrode or the electric power transmitting means T1, T2, with physically supporting each of the core units or fixing the electrode; (iv) a cooling means for cooling the electrode or the coupling support with a cooling medium such as gas, water, or oil and the like; (v) an insulating means for electrically insulating the metallic material constituting the shell Rs or the base Rb of the deposition reactor; and (vi) a part, a fitting and the like for coupling, sealing, insulating and assembling the elements as described hereinabove for constructing an individual electrode unit.

The shape and dimension of the corresponding electrode units of the electrode means E1, E2 may be determined by considering a diameter of the silicon rod to be finally manufactured, the number and installation arrangement of the core units, a space available for installing all the required electrode units E1, E2, and their corresponding electric power transmitting means T1, T2, and a cross-sectional area of an electrode of the electrode unit by which electrical self-heating is weak. The electrode units constituting either of the electrode means E1, E2 and the corresponding electric power transmitting means T1, T2 may be installed individually and then finally connected mechanically and electrically to each other. However, it is also allowable to design, fabricate and preassemble a plurality of electrode units and the corresponding electric power transmitting means as a more simplified and integrated body. This may be achievable when a plurality of the electric power transmitting means are integrated into a single, electrically conductive electric power transmitting body as an example of the electrical connecting means. Then, the integrated electric power transmitting body and the corresponding electrode units can be fabricated or preassembled in a more integrated, compact manner for convenient installation.

The coupling support and/or the electrical coupling unit constituting an electrode unit are generally made of a high-purity graphite material which can be easily fabricated. To prevent or reduce a carbon contamination of the silicon deposition output a layer of a functional ceramic material, such as silicon carbide, is often formed on the surface of such graphite-based elements. In assembly and installation of the electrode units an electrical insulation should be secured between such conductive elements and the metal-based shell Rs and/or base unit Rb of the deposition reactor.

During the reactor operation part of each electrode unit may be exposed to a high temperature of the inner space Ri, by which the electrical insulating material or the sealing material installed needs to be protected from a thermal degradation. Accordingly, it is preferred to cool some area or the entire area of the base unit Rb, the electrode made of a metal material, the insulating parts and the like by using a circulated cooling medium.

In the present invention, the first and second electrode means E1, E2 corresponding to the first and second core means C1, C2, may be divided into one or a plurality of the first and second electrode groups, respectively. Then it may be possible to supply electricity independently to each of the first and/or second electrode groups. As a result, a plurality of core units represented by an individual core means can be divided into a plurality of core groups in accordance with the classification of the electrode groups. Then, as the case for an individual core means, a plurality of core groups constituting each of the core means can be electrically connected to each other in series and/or parallel circuits. According to such connection scheme, the electric power transmitting means for electrical connections of the corresponding electric power supply source to the electrode units as well as of the electrode units to each other can be installed or assembled in the deposition reactor and the corresponding electric power supply system.

The electric power transmitting means electrically connecting the electric power supply source and the electrode units may be installed in, at or outside of the shell Rs and the base unit Rb of the deposition reactor. Further, the electric power transmitting means or the electrical connecting means used for interconnection of the electrode units E1, E2 can be installed at any locations, i.e., inside or outside the reactor when an appropriate electrical insulation is secured against the metallic material of the reactor. When installed at an outside of the deposition reactor, the electric power transmitting means may comprise a commercially available connecting means or a conductive metal such as a cable, a bar or a shaped body with a small electric power loss.

In case when, following an appropriate electrical insulation, the electric power transmission means or the electrical connecting means is installed within the deposition reactor, for example, just above the base unit Rb for electrically connecting a plurality of electrode units E1, E2, a body fabricated for that purpose by machining a graphite material into a desired shape can be used on behalf of a metal material. To prevent generation of impurity components or fine powders from itself, the surface of the graphite-based conductive body may preferably be subject to a physical and/or chemical processing to form a functional ceramic layer, such as silicon carbide layer.

The electric power transmitting means itself or the electrical connecting means itself used to interconnect the electrode units can be regarded as an expanded electrode unit because they have something in common in that the electricity flows through such a large cross-sectional area as not to raise a remarkable resistance heating. Accordingly, a plurality of electrode units E1, E2, as well as the electric power transmitting means or the electrical connecting means for interconnecting the electrode units can be designed, fabricated and installed in the form of an integrated single body or an assembly of multiple integrated components. This method greatly reduces the space required for installing the electric power transmitting means T1, T2 for a plurality of electrode units installed above or below the base unit Rb, precludes elements of electrical contact resistance due to the connections between the electrode units and the corresponding electric power transmission means, allows an easy and convenient assembling and dismantling of the reactor, and enhances reliability in terms of safety.

A scheme how to electrically connect the electrode groups for each of the first and second core means C1, C2 determines how to constitute the electric circuits of the corresponding core groups as described above. If the electricity can be independently supplied to each of the electrode groups, the respective starting time of electrical heating can be set differently for each electrode group according to the present invention. It is also possible for the voltage-current condition for each of the core groups to be controlled differently to each other, if necessary.

The electric power supply system allowing an independent power supply to each of the electrode groups can be constructed such that the groups are connected electrically in series and/or parallel circuits. Such an electrical scheme may be determined based on the electric power required in each core unit, the installation arrangement (spatial layout) and interconnection method of the electrode units, the specification of the electric power supply source, and the like.

Basically, the electricity required for heating the first core means C1 is independently supplied from the first electric power supply source V1 to the first electrode unit E1 through the first electric power transmitting means T1. Likewise, the electricity required for heating the second core means is independently supplied from the second electric power supply source V2 to the second electrode unit E2 through the second electric power transmitting means T2.

The first electric power supply source V1 and the second electric power supply source V2 comprise respectively an electric power converting system having a function for converting an input electricity with a high voltage-low current characteristic into an output electricity with a low voltage-high current characteristic. If necessary, a function for converting alternating current to direct current may also be included in the respective electric power supply sources V1, V2. They V1, V2 can be constructed as separate, individually installed electric power converting systems, or can be constructed as a single, combined-type electric power converting system.

During the silicon deposition process the electrical heating of the respective core units is subject to interdependencies between a current passing through the core units and the silicon deposition outputs, an electric resistance of the conductive materials, and a potential difference imposed between a pair of corresponding electrode units. Based on the electricity characteristic it is possible to control with time the rate of electrical heating of each core means, each core group or each core unit. This can be achieved by the operation and control of the first and second electric power supply source V1, V2 as described above with either voltage or current being selected as the control parameter.

Meanwhile, it may be possible that the first electric power supply sources V1 for one deposition reactor is assigned to another first core means C1 comprised in another deposition reactors. In this case, one or a plurality of the first core means C1 comprised in one or a plurality of deposition reactors, including the corresponding first core groups, first core units and first electrode units, can be electrically connected to each other by the corresponding electric power transmitting means T1 in series and/or parallel circuits based on a single electric power supply sources V1. It may also be possible that the second electric power supply sources V2 for one deposition reactor is assigned to another second core means C2 comprised in another deposition reactors. In this case, one or a plurality of the second core means C2 comprised in one or a plurality of deposition reactors, including the corresponding second core groups, second core units and second electrode units, can be electrically connected to each other by the corresponding electric power transmitting means T2 in series and/or parallel circuits based on a single electric power supply sources V2.

In the present invention the first core element used for each of the first core units constituting the first core means C1 is made of a resistive material, such as a metal-based or a carbon-based material, other than an intrinsic or doped silicon.

The first core means can have a shape selected from the group consisting of a rod, a wire, a filament, a bar, a strip and a ribbon having a cross-sectional shape of a circle, an oval or a polygon (triangle, quadrangle, hexagon, octagon and the like), and of a conduit, a tube, a cylinder, and a duct having a cross-sectional shape of a concentric circle, a concentric oval or a concentric polygon.

It is preferred that the resistive material used for constituting the first core means C1 has the resistivity value in the range of about 1 μohm-cm to several ohms-cm.

In the preferred embodiment, the resistive material can be (i) a metal or an alloy comprising at least one metal element selected from the group consisting of tungsten (W), rhenium (Re), osmium (Os), tantalum (Ta), molybdenum (Mo), niobium (Nb), iridium (Ir), ruthenium (Ru), technetium (Tc), hafnium (Hf), rhodium (Rh), vanadium (V), chromium (Cr), zirconium (Zr), platinum (Pt), thorium (Th), lanthanum (La), titanium (Ti), lutetium (Lu), yttrium (Y), ferrum (Fe), nickel (Ni), aluminum (Al) and a mixture thereof; (ii) a ceramic metal material containing at least one component selected from the group consisting of molybdenum silicide (Mo—Si), lanthanum chromium oxide (La—Cr—O), zirconia and a mixture thereof; or (iii) a carbon-based material comprising at least one component selected from the group consisting of amorphous carbon, graphite, silicon carbide (SiC) and a mixture thereof. As described above, the resistive material used for constituting the first core means C1 can be selected from a wide range of materials.

Besides possessing excellent electrical properties for use in the present invention, the first core element needs preferably to be selected among high-purity materials comprising organic or inorganic impurity components as less as possible. This can lead to a minimized impurity contamination of the first deposition output D1 formed outwardly on the core element.

It is also preferred that the first core units constituting the first core means C1 be heat-treated at a temperature in the range of 400-3,000° C. The heat treatment under an atmosphere of high-purity helium, nitrogen, argon or helium may remove or chemically convert residual impurity components. This work can be carried out in the step of fabricating the first core units or prior to the silicon deposition. It does not matter if the above heat treatment is carried out through the electrical heating of themselves after installation in the deposition reactor used in the present invention or in a conventional deposition reactor available by the prior art.

On the other hand, the second core units constituting the second core means C2 can be made of a silicon material selected from the group consisting of intrinsic polycrystalline silicon, intrinsic single crystalline silicon, doped silicon, containing n-type or p-type dopant, and a mixture thereof.

Like the first core means C1, the second core means C2 can have a shape selected from the group consisting of a rod, a wire, a filament, a bar, a strip and a ribbon having a cross-sectional shape of a circle, an oval or a polygon (triangle, quadrangle, hexagon, octagon and the like), and of a conduit, a tube, a cylinder, and a duct having a cross-sectional shape of a concentric circle, a concentric oval or a concentric polygon.

In the present invention, although being dependent on that of the silicon-based core unit at an early stage of silicon deposition, a cross-sectional shape of a polycrystalline silicon rod is progressively transformed into a rather circular or oval shape with its size (i.e., thickness) being enlarged with deposition time.

Figure 4:
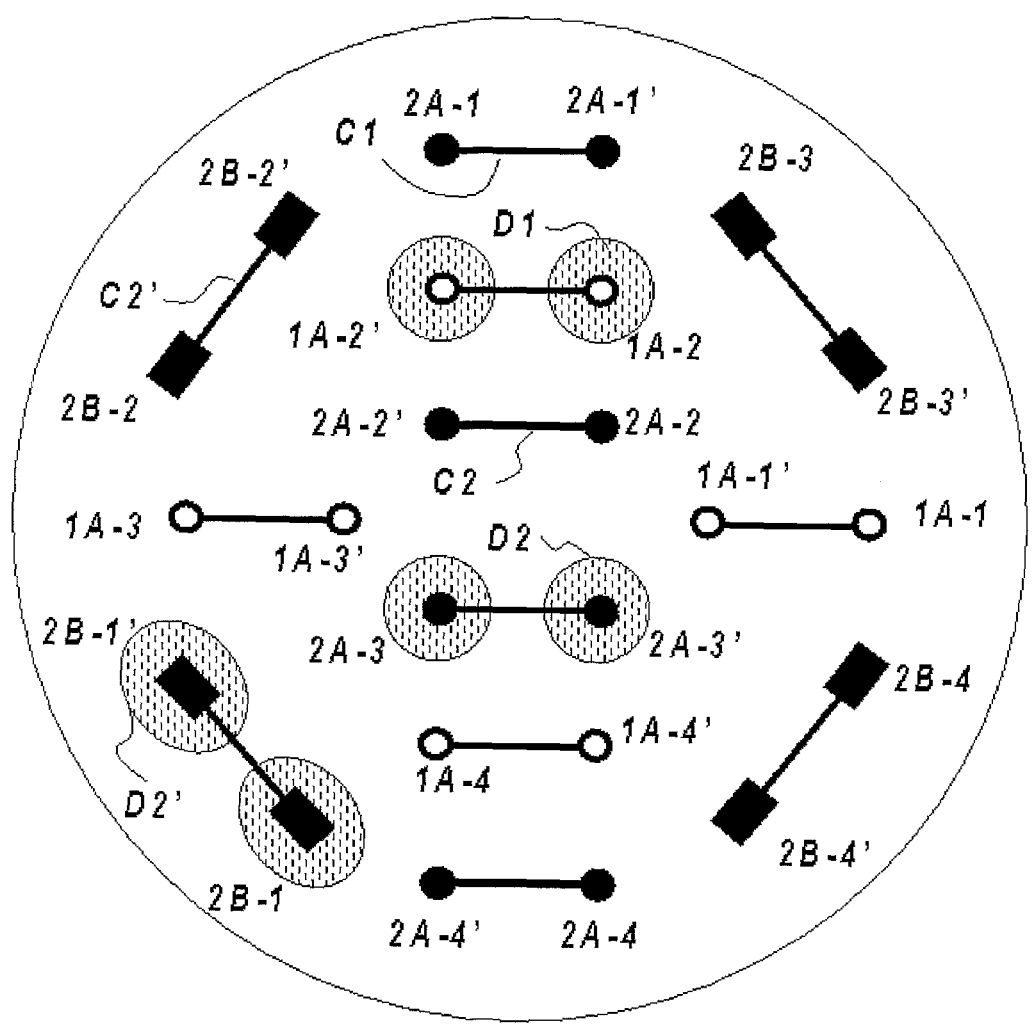
Figure 6:
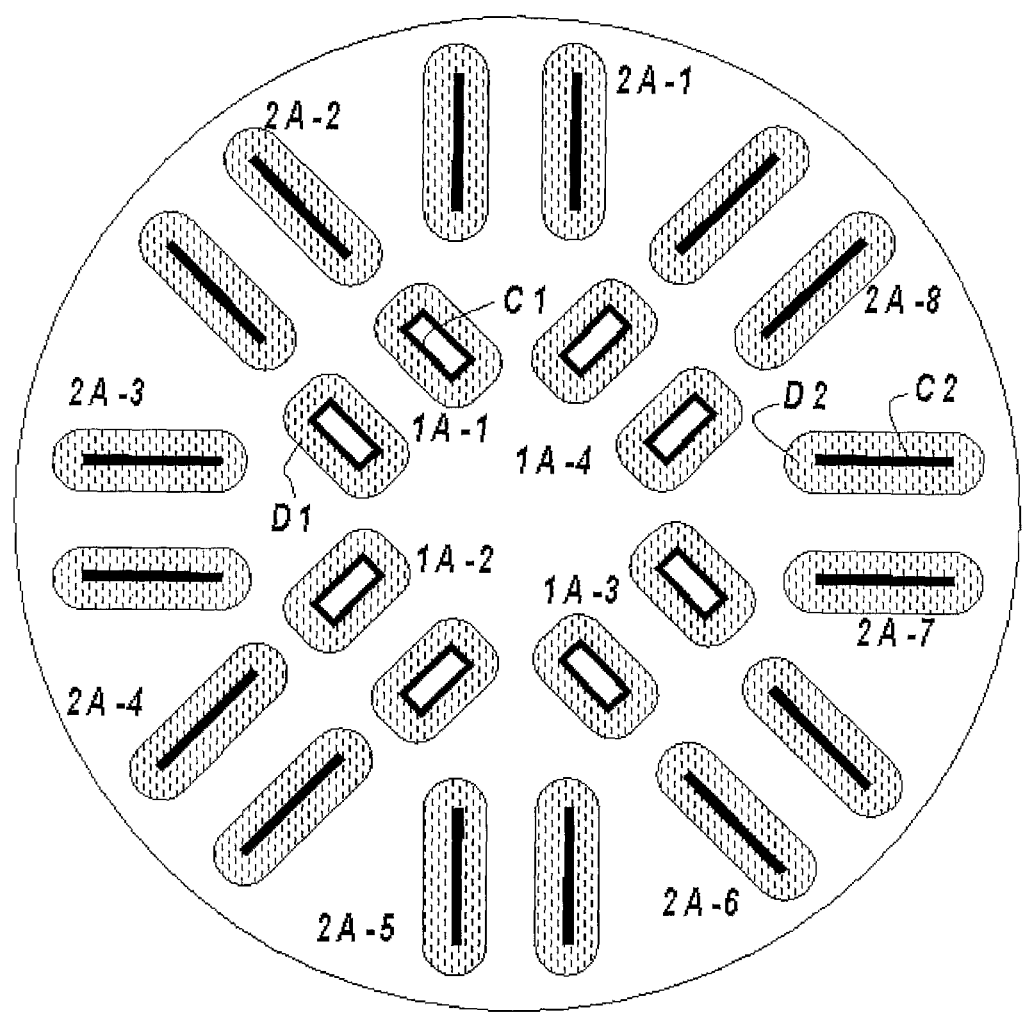

The shapes of the core means C1, C2, in terms of the cross-sections of the corresponding core elements, can be selected among those satisfying the commercial availability of the element materials, a possibility of fabrication, their forming or fabrication costs, the installation arrangement (i.e., co-planar layout) of the electrode means and the core means, etc. Although all the core units constituting both of the core means C1, C2 may have an identical cross-sectional shape, their shapes may also be different to each other. Furthermore, either of the core means C1, C2 may be composed of differently shaped core groups or core units. FIG. 4 and FIG. 6 illustrate the differently shaped core means and/or core groups.

The rod-shaped core units having a circular cross-section can generally be selected for constituting the corresponding core means C1, C2. Instead, all or part of the red-shaped core units may be replaced by either of the strip (or ribbon)-shaped core units or by the tube-shaped hollow core units. In any case, an appropriate fabrication of the corresponding electrode units E1, E2 is required such that stable installation of the core units and their electrical contact with corresponding electrodes can be secured irrespective of the shape of cross-section.

As in the conventional bell-jar type reactor, the dimensions of the core means C1, C2 which can be used in the present invention can be selected in terms of their cross-sections as follows: an apparent diameter of a circular cross-section may be in the range of about 3-30 mm, while a longest, diagonal length and a shortest length being in the range of about 5-100 mm and 0.5-6 mm, respectively. Meanwhile, the longitudinal lengths of two core means can preferably be selected such that they both can be installed at nearly the same heights.

Figure 2:
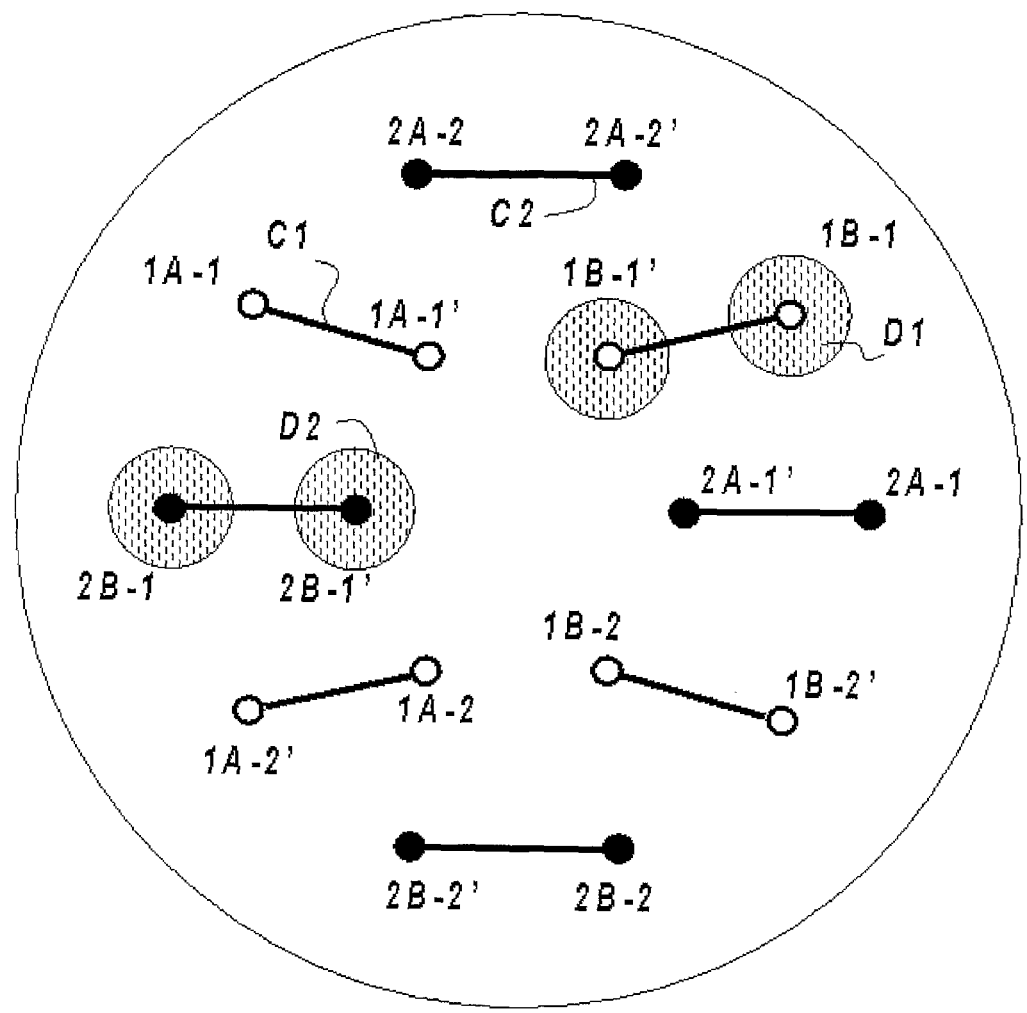
FIGS. 2-7 are cross-sectional views schematically showing an illustrative arrangement of a first core means and a second core means in the deposition reactor for preparing rod-shaped polycrystalline silicon according to the present invention.

What determines an individual dimension of the core means C1, C2 other than the cross-sectional thickness and the longitudinal height is a spacing between a pair of vertically installed core elements constituting a single core unit. The spacing corresponds to a layout pitch between 1A-1 and 1A-1' or 2A-1 and 2A-1' as illustrated in FIG. 2, that is, a spacing between the adjacent centers of a pair of electrode units constituting and supporting a single core unit. In the case of the core element having a circular cross-section, it is preferable, in general, for the spacing (i.e., layout pitch) to be in the range of about 1.2-1.8 times of an average diameter of a silicon rod product to be manufactured.

On the other hand, the core units need to be installed as many as possible in the inner space Ri of the deposition reactor so that reaction yield and productivity could be enhanced according to an increased surface area for silicon deposition enhance, and a maximum number of the silicon rod products with a predetermined size could be manufactured therein. For this purpose, it is preferred that the spacing between the adjacent core units, based on a shortest spacing between two vertical core elements of different core means, be in the range of about 1.2-2.4 times of an average diameter of a silicon rod product to be manufactured.

In order to substantially increase the reactor productivity and the positive effects of the present invention, it is important to optimize a co-planar layout, i.e., installation arrangement of the core units and the corresponding electrode units such that the core units and the corresponding electrode units can be installed as many as possible on the base unit Rb. A classified installation of the core means C1, C2, the corresponding respective core groups and the corresponding core units can be possible satisfying the optimized installation arrangement.

In constructing the electric power supply system for an independent control of power supply to respective core means C1, C2, core groups and core units in the present invention, an electric circuit and a sequence of current flow can be established according to the installation arrangement of the core units and the electrode units as well as to connection schematics for their series-parallel combination. Here, either of a series or a parallel connection may be applied to the electrical connection of the core units, if the required voltage-current condition is satisfied for every core unit or the corresponding electrode units.

However, if all the core units are connected in parallel to each other, a voltage applied to every core unit becomes very low, and hence there occurs a problem that a very high electric current should be provided. Otherwise, if too many core units are connected to each other in series, the potential difference between an inlet terminal and an outlet terminal of the circuit is very high, thereby resulting in a low electric current for every core unit.

The number of the core units connected to each other in series depends on the dimension of the core unit and its electrical properties. To prevent such a high potential difference exceeding the range of about 100-200 V, the electric power supply system needs to be constructed by properly combining both of the series and parallel connections of the core units.

Meanwhile, based on a longitudinal direction of a core unit, a piece of core element can be formed in a straight line-shape, U-shape, W-shape and the like, and its both ends can be fixed to and installed on a pair of corresponding electrode units. For example, as illustrated for the first core means C1 in FIG. 1, the core units can be installed such that a U-shaped (hereinafter, referred to as the "single body type") core unit C1 is well fixed to a pair of corresponding electrode units E1. Also, as illustrated for the second core means C2 in FIG. 1, a pair of vertical core element parts and a horizontal core element part serving as a bridge connecting both upper ends of the vertical parts are assembled together to form an electrically connected core unit C2 (hereinafter, referred as the "assembled type"), which is well fixed to a pair of corresponding electrode units E2.

The core units constituting an individual core means can be prepared by directly forming a single core element like a single body type (U-shape) core unit, or a plurality of core element parts can be connected to each other to form the single body type (U-shape) core unit. These methods can be applied mainly for preparing the first core units constituting and represented by the first core means C1 as illustrated in FIG. 1. Either of the methods can hardly be employed for preparing the second core units constituting and represented by the second means C2, because the core element parts made of a silicon material should be connected to each other under a high-purity atmosphere by means of a plasma/arc welding by which it is practically difficult to form the U-shaped single body.

In the case of the assembled type core unit where a core unit for each of the two core means C1, C2 consists of a plurality of straight line-shape core element parts, two vertical core element parts, which are mounted vertically on a pair of corresponding electrode units E1, E2, should be physically and electrically connected with the horizontal core element part serving as a bridge. This can be executed by: (i) mechanically processing a connecting portion of the core element parts; (ii) welding or connecting the connecting portion by using a welding means or plasma/arc; (iii) connecting the core element parts using a connection fitting or coupling aid such as a wire-shaped coupling material; or (iv) applying aforementioned methods in a combined manner.

The above method for preparing the assembled type core units can be applied to all of the first and second core units, and it is desirable for the vertical and horizontal core element parts to have the same material and same cross-sectional dimension. However, there exists no problem in carrying out the present invention even though the vertical and horizontal core element parts are made of different materials and have different dimensions with each other. For example, if the second core unit is constituted as the assembled type core unit using a pair of vertical core element parts made of silicon, a silicon material having cross-sectional shape and area similar to those of the vertical core element parts may be used for preparing the horizontal core element part serving as the bridge. Also, instead of using a silicon-based bridge, it does not matter whether or not to use a non-silicon, resistive material with cross-sectional shape and area different from those of the vertical core element parts.

In preparing the assembled type second core means C2 with the horizontal core element part being made of the resistive material applicable to the first core means C1, it is preferred to determine its physical specification, including a cross-sectional dimension, a length and the like, considering its temperature-dependent electrical properties. It is furthermore preferable to fabricate both ends of the vertical core element parts such that they can be coupled well with for the horizontal core element part.

Once reaction gas Gf is supplied into the inner space Ri of the deposition reactor, silicon deposition occurs to form the first deposition output D1 and/or the second deposition output D2 in an outward direction of the first core means C1 and/or the second core means C2, respectively, according to the present invention.

Here, the "outward direction" means a direction which is perpendicular to the surface of a core unit, that is, a thickness direction or a radial direction of its cross-section. When silicon deposition proceeds according to the operation silicon deposition, a diameter or a diagonal length of each of the deposition outputs D1 and D2 increases gradually, and thereby a polycrystalline silicon rod product of a desired size is finally formed within the reactor.

The reaction gas Gf, which can be used in the present invention, contains at least one silicon-containing component selected from the group consisting of monosilane ($SiH_4$), dichlorosilane ($SiH_2Cl_2$), trichlorosilane ($SiHCl_3$), silicon tetrachloride ($SiCl_4$) and a mixture thereof. Pyrolysis and/or hydrogen reduction of the silicon-containing component leads to silicon deposition that forms the silicon deposition output.

Although being composed of only the silicon-containing component for preparing the rod-shaped polycrystalline silicon, the reaction gas Gf may further contain at least one gas component selected from the group consisting of hydrogen ($H_2$), nitrogen ($N_2$), argon (Ar), helium (He), hydrogen chloride (HCl), and a mixture thereof to control the characteristic of the deposition reaction and the composition of an off-gas Go.

For preferred silicon deposition to occur on the surfaces of the first and second deposition outputs D1, D2, it is preferred that the silicon deposition occurs in the inner space Ri of the deposition reactor at a reaction pressure in the range of 1-20 bar absolute and a reaction temperature in the range of 650-1,300° C. based on the surface temperature of the first deposition output D1 and/or the second deposition output D2.

If the reaction pressure is less than 1 bar absolute, the deposition rate of silicon on the deposition outputs D1, D2 and the reactor productivity becomes unfavorably low. Otherwise, the higher the reaction pressure is, the more advantageous the deposition reactor is in the aspect of productivity. This characteristic is more prominent especially when trichlorosilane is selected as the silicon-containing component than the case of monosilane. However, if the reaction pressure is maintained at a level exceeding 20 bar to remarkably increase the reactor productivity, serious problems are encountered as follows: the fabrication cost of the deposition reactor itself as well as the subsidiary units in connection with the reactor becomes excessive; it becomes more difficult to secure process safety; and the feed rate (moles/hr) of the raw material becomes too high for the surface temperatures of the deposition outputs D1, D2 to be maintained within an allowable reaction temperature range by the electrical heating of the core means C1, C2.

Based on convenience and reliability in temperature measurement and considering the facts that silicon should be continuously deposited on the surfaces of the deposition outputs in an outward direction of the core means C1, C2, and surface temperatures are different according to the installed locations of the deposition outputs D1, D2 in the inner space Ri, it is preferred that a temperature of the surface of the deposition outputs D1, D2 is regarded as a standard of the reaction temperature.

Although a reaction temperature varies according to the composition of reaction gas Gf to be used, the rate of silicon deposition is significantly low or negligible at a temperature less than 650° C. with the reactor productivity being unfavorably low. Otherwise, the deposition rate increases with reaction temperature. However, at temperatures exceeding 1,300° C., the content of a component that cannot be recycled increases excessively in the off-gas Go. Also, the temperature of central parts of the core means C1, C2, that is, the temperature of the core elements exceeding 1,400° C. may cause a collapse of the silicon rod during the deposition process, and an enormous heat loss through the reactor shell Rs. Therefore, it is recommended to set the reaction temperature representing an allowable temperature range for silicon deposition within the range of 650-1,300° C., considering the conditions such as compositions of the reaction gas Gf and the off-gas Go, pressure, silicon deposition rate, energy efficiency and the like.

In a batchwise process for preparing rod-shaped polycrystalline silicon according to the present invention, diameters and surface areas of the deposition outputs D1, D2, a heat load of the core means C1, C2, a heat loss through the shell Rs of the deposition reactor increase with operating time. It is then desirable to predetermine the operation conditions such as the feed rate and composition of the reaction gas Gf, the reaction temperature, the reaction pressure, the electric power supply and the like. It is also important to optimize the above conditions by changing them with operating time.

In the process of preheating the second core means C2 by the first core means C1 electrically heated in advance according to the present invention, there may possibly be a contamination of the silicon-based second core means C2 due to the resistive material constituting the first core means C1 spaced apart from the second core means C2. Here it is required to remark following: the preheating process according to the present invention is carried out at a normal or high pressure, i.e., in a non-vacuum condition; the temperature of the first core means C1 is less than about 3,000° C., i.e., the temperature is less than the melting point of the resistive material; an ion with a high energy can hardly exist in the inner space. Then an evaporation of impurity components or a sputtering can hardly occur at the surface of an appropriately heat-treated first core element, which is believed not to deteriorate the purity of the second core element and ultimately the second deposition output.

Compared with the second deposition output D2, on the other hand, the first deposition output D1 formed outwardly on the first core element made of a resistive material has a relatively high risk of contamination caused by the impurity components contained in the resistive material. Therefore, according to the present invention based on in a mixed core means, a solar-grade polycrystalline silicon to be used for solar cells can be formed in the first deposition output D1, and an electronic-grade polycrystalline silicon to be used for semiconductor devices is formed in the second deposition output D2. Instead of a simultaneous preparation of the two grades of polycrystalline silicon in the same deposition reactor, only one kind of polycrystalline silicon to be used for either solar cells or semiconductor devices can be prepared by forming the first and second deposition outputs D1, D2.

Once the process for silicon deposition is sufficiently carried out according to the present invention, a diameter or diagonal length of the silicon rod reaches a maximum allowable value and the deposition operation is halted before a deposition output becomes in contact with another adjacent deposition output. Thereafter, the reactor is dismantled and the deposition output rods are collected.

In order to enhance the quality of the first deposition output D1 formed in an outward direction of the first core element C1a, it is preferred that the first core means C1 according to the present invention is constituted by forming one or a plurality of separation layer(s) C1b, C1b', C1b" on the surface of the first core element C1a made of a resistive material (see FIG. 8 to FIG. 12) This makes it possible to prevent the first deposition output D1 from being contaminated by the components contained in the first core element C1a or to minimize the possibility of the contamination of the first deposition output D1. If the first core unit can be constituted by forming the separating layer C1b on the surface of the first core element C1a, it is possible to prepare high-purity silicon deposition outputs D1, D2, which can be used for the solar cells and/or the semiconductor devices, on both of the first and second core means C1, C2 according to the present invention.

In the conventional silicon deposition reactor only one kind of the core means has been selected between the resistive material-based first core means C1 and the silicon-based second core means C2. However, according to the present invention, as illustrated in FIG. 8 to FIG. 12, the first core means C1 constituted by forming the separation layer C1b on the first core element C1a is installed in the deposition reactor together with the second core means C2 made of silicon material; the second core means C2 is preheated by the first core means C1 which is electrically heated in advance; an electrical heating of the preheated second core means C2 is then initiated to form the silicon deposition outputs D1, D2 outwardly on the core means C1, C2, respectively; and finally a rod-shaped high-purity polycrystalline silicon can be prepared.

Accordingly, the separation layer C1b formed on the surface of the first core element C1a serves as a substrate on which a formation of the first deposition output D1 is initiated, and prevents a diffusion of the impurity components from the first core elements C1a to the first deposition output D1 during the deposition process. The separation layer C1b differs from the polycrystalline silicon formed in the first deposition output D1 in its martial kind, structure and physical properties. Thus, the separation layer can be easily separated from the first deposition output D1 after the preparation of the silicon rod outputs is completed.

The separation layer C1b can consist of one layer or a plurality of layers. If the number of the layers exceeds 5, a lot of time, labor and cost for forming the separation layer C1b are required, deteriorating the economical advantage of the present invention. Accordingly, the number of the separation layer(s) is preferably in the range of 1 to 5, i.e., it is recommended that the separation layer C1b consists of five kinds of layers or less.

The separation layer C1b according to the present invention has a function of a diffusion barrier for preventing the diffusion of a specific component or element between two metallic contact areas at high temperature. Here, the barrier component constituting each layer of the separation layer(s) C1b can be selected from (i) silicon nitride, silicon oxide, silicon carbide or silicon oxynitride or (ii) a nitride, an oxide, a silicide, a carbide, an oxynitride or an oxysilicide comprising at least one metal element selected from the group consisting of tungsten (W), rhenium (Re), osmium (Os), tantalum (Ta), molybdenum (Mo), niobium (Nb), iridium (Ir), ruthenium (Ru), technetium (Tc), hafnium (Hf), rhodium (Rh), vanadium (V), chromium (Cr), zirconium (Zr), platinum (Pt), thorium (Th), lanthanum (La), titanium (Ti), lutetium (Lu), yttrium (Y), and a mixture thereof.

A barrier component constituting the separation layer C1b according to the present invention comprises a substance consisting of a nitride of silicon or an element selected from metals constituting the first core element C1a, such a nitride can comprise a single component nitride such as Si—N, W—N, Os—N, Ta—N, Mo—N, Nb—N, Ir—N, Ru—N, Tc—N, Hf—N, Rh—N, V—N, Cr—N, Zr—N, Pt—N, Th—N, Ti—N, Lu—N, Y—N and the like and a mixed metal nitride such as W—V—N, Ti—Si—N, Ti—C—N, Hf—Ta—Mo—N and the like.

Most of such nitride-based components have a melting point of 2,000° C. or higher, where other physical properties of such nitride-based components differ from those of the first core element C1a or the first deposition output D1. Such nitride-based components can combine with metal impurity ions of the first core element C1a, which enables such nitride-based components to be used for forming the separation layer C1b. However, there is little possibility of contaminating the first deposition output D1 with nitrogen component of the nitride-based the separation layer C1b at a high reaction temperature, and so the nitride-based separation layer can be used for forming one or a plurality of separation layer(s) C1b and can constitute the first core means C1, together with the oxide-based, oxynitride-based, carbide-based, silicide-based or oxysilicide-based separation layer C1b.

A barrier component constituting the separation layer C1b according to the present invention comprises a substance consisting of an oxynitride of silicon or an element selected from metals constituting the first core element C1a, where such an oxynitride can comprise a single component oxnitride such as Si—O—N, W—O—N, Os—O—N, Ta—O—N, Mo—O—N, Nb—O—N, Ir—O—N, Ru—O—N, Tc—O—N, Hf—O—N, Rh—O—N, V—O—N, Cr—O—N, Zr—O—N, Pt—O—N, Th—O—N, Ti—O—N, Lu—O—N, Y—O—N and the like, and a mixed metal oxynitride such as Si—Al—O—N, Hf—Zr—O—N, Mo—W—O—N, V—Mo—W—O—N and the like.

Most of such oxynitride-based components have a melting point of 2,000° C. or higher, where other physical properties of such oxynitride-based components differ from those of the first core element C1a or the first deposition output D1, and such oxynitride-based components can combine with metal impurity ions of the first core element C1a, which enables such oxynitride-based components to be used for forming the separation layer C1b. However, there is little possibility of contaminating the first deposition output D1 with nitrogen component of the oxynitride-based the separation layer C1b, at a high reaction temperature, and so the oxynitride-based separation layer can be used for forming one or a plurality of separation layer(s) C1b and can constitute the first core means C1 together with the nitride-based, oxide-based, carbide-based, silicide-based or oxysilicide-based separation layer C1b.

A barrier component constituting the separation layer C1b according to the present invention comprises a substance consisting of an oxide of silicon or an element selected from metals constituting the first core element C1a, where such an oxide can comprise a single component oxide such as Si—O, W—O, Ta—O, Nb—O, Hf—O, Zr—O, Ti—O and the like, and mixed metal oxide such as W—V—O, Ti—Si—O, Sr—Ti—O, Sr—Ti—Nb—O, Sr—La—Al—O, La—Mn—O, Sr—Hf—O, Nb—Ta—O, Ba—Zr—O, Ba—Mo—O, Ba—Ce—O, Ba—Ti—O, Ca—Ti—O, Sr—Zr—O, Sr—Mn—O, Hf—Ta—Mo—O, Y—Zr—O and the like.

Most of such oxide-based components have a melting point of 1,420° C. or higher, where other physical properties of such oxide-based components differ from those of the first core element C1a or the first deposition output D1 which enables such oxide-based components to be combined with metal impurity ions of the first core element C1a, and so such oxide-based components can be used for forming the separation layer C1b. However, there is little possibility of contaminating the first deposition output D1 with oxygen component of the oxide-based the separation layer C1b at a high reaction temperature, and so the oxide-based separation layer can be used for forming one or a plurality of separation layer(s) C1b and can constitute the first core means C1 together with the nitride-based, oxynitride-based, carbide-based, silicide-based or oxysilicide-based separation layer C1b.

A barrier component constituting the separation layer C1b according to the present invention comprises a substance consisting of a carbide of silicon or an element selected from metals constituting the first core element C1a, where such a carbide can comprise a single component carbide such as Si—C, W—C, Os—C, Ta—C, Mo—C, Nb—C, Ir—C, Ru—C, Tc—C, Hf—C, Rh—C, V—C, Cr—C, Zr—C, Pt—C, Th—C, Ti—C, Lu—C, Y—C and the like, a mixed metal carbide such as Si—W—C, Ta—Hf—C, Si—Ti—C and the like, and the transition metal carbon nitride such as W—C—N, Ta—C—N, Zr—C—N, Ti—C—N and the like.

Most of such carbide-based components have a melting point of 2,000° C. or higher, where other physical properties of such carbide-based components differ from those of the first core element C1a or the first deposition output D1, and such carbide-based components can combine with metal impurity ions of the first core element C1a, which enables such carbide-based components to be used for forming the separation layer C1b. However, there is a possibility of contaminating the first deposition output D1 with a carbon component of the carbide-based the separation layer C1b at a high reaction temperature, and so it is also desirable to isolate the first deposition layer D1 with the nitride-based oxynitride-based, silicide-based, or oxysilicide-based separation layer C1b, rather than applying in the form of a single separation layer C1b.

A barrier component constituting the separation layer C1b according to the present invention comprises a substance consisting of a silicide of silicon or an element selected from metals constituting the first core element C1a, where such a silicide can comprise a single component silicide such as W—Si, Os—Si, Ta—Si, Mo—Si, Nb—Si, Ir—Si, Ru—Si, Tc—Si, Hf—Si, Rh—Si, V—Si, Cr—Si, Zr—Si, Pt—Si, Th—Si, Ti—Si, Lu—Si, Y—Si and the like, mixed metal silicide such as W—V—Si, W—Ti—Si—N, Ti—Zr—Si—C, Hf—Ta—Si—N and the like, and such silicide based component can comprises oxysilicide obtained by adding oxygen element to a silicide mentioned above.

Content of component can be adjusted in a way that such silicide-based or oxysilicide-based components have a melting point of 1,420° C. or higher, the physical properties of such silicide-based or oxysilicide-based components differ from those of the first core element C1a or the first deposition output D1 and that such silicide-based or oxysilicide-based components can combine with metal impurity ions of the first core element C1a, and so such silicide-based or oxysilicide-based components can be used for forming one or a plurality of the separation layers C1b. The silicide-based or oxysilicide-based separation layer can form the first core means C1 together with the nitride-based, oxide-based, oxynitride-based, or carbide-based separation layer C1b.

As described above, a barrier component constituting the separation layer C1b can comprise a boron-containing component having an excellent physical property such as a nitride, an oxide, a carbide or an oxynitride. Since there is a possibility of contaminating the first deposition output D1 with a boron component in the boron-based the separation layer C1b at a high reaction temperature, the first core element C1a should be isolated perfectly from the first deposition layer D1 with the nitride-based oxynitride-based, silicide-based, or oxysilicide-based separation layer C1b rather than applying in the form of a single separation layer C1b.

According to the present invention, to constitute the first core means C1 by forming the separation layer 1b on the surface of the first core element C1a can be performed in a variety of methods.

As an example to form the separation layer C1, the first core means C1 can be constituted by surrounding the surface of the first core element C1a with a plurality of separation layer constituting units made of a barrier component as described above.

In case the separation layer C1b is formed by the method of assembling the separation layer constituting units as described above, the barrier components used for those separation layer consisting units need to be prepared by manufacturing the preassembled units made of the barrier component at predetermined size, shape and number and/or by coating a barrier component to each of the preassembled units. Then, the first core element C1a surrounded by the separation layer C1b can be completed by assembling in layers or appropriately connecting or forming the preassembled separation layer constituting units. This method is especially suitable for a case when an assembled type of the first core unit is constructed by assembling a plurality of first core element units. Consisting of one or a plurality of separation layer(s) C1b having the barrier component in a thickness direction, each of the separation layer constituting units may be independently prepared in advance with a cross-sectional shape of a circle, a polygon, a concentric circle or a concentric polygon. The first core unit can now be constructed by assembling in layers, connecting in a concentric way the first core element together with the thus prepared separation layer constituting units. According to this method, a tiny space can exist between the surface of the first core element C1a and the separation layer, between the separation layers or between the separation layer constituting units. However, if any, the existence of the tiny space does not exert an adverse effect on the formation of the deposition output in an outward direction of the core element pursuant to the present invention.

Unlike the method as exampled above, the separation layer C1b is formed by coating the barrier component on the surface of the first core element C1a. The direct coating of each of the selected barrier components may be applied on its surface in a predetermined thickness. If the direct coating in the manner as described above is applied, the separation layer C1b consisting of a plurality of layers can be formed in sequence even within the same coating device or can be formed in a number of separate coating devices. According to this method, a separation layer required can be densely formed, and an occurrence of a tiny space between the surface of the first core element C1a and the separation layer or between the separation layers is less probable. No problem is exerted on the formation of the deposition output.

On the other hand, by combining the scheme of applying the separation layer constituting units to the core element and the scheme of applying the direct coating method as described above, it is also possible to constitute the first core means C1 by forming the separation layer on the core element.

Part of the separation layer(s) or the entire separation layer(s) C1b can be formed on the surface of the first core element C1a in another kind of reactor or a special coating device according to the present invention. Otherwise, the same work can also be formed in a deposition reactor; the work can also be carried out in the inner space Ri of the silicon deposition reactor used in the present invention or of an existing conventional deposition reactor available. In this case, one or a plurality of the first core elements C1a are installed on the corresponding electrode units of the deposition reactor; they become heated upon supplying electricity through the electrode units; then a raw material gas is supplied into the inner space of the deposition reactor to form the separation layer C1b on the surface of the first core element C1a; and a completed set of the first core means C1 is finally obtained.

It is also possible to perform the separation layer forming process by use of both the deposition reactor and the other kind of coating device(s) in sequence; for example, after forming part of the separation layer in a special coating device, it is possible to additionally form the remaining part of the separation layer C1b in the deposition reactor pursuant to the present invention or in the existing conventional deposition reactor. In this case, one or a plurality of the uncompleted first core elements C1a are installed on the corresponding electrode units of the deposition reactor, they becomes heated upon supplying electricity through the electrode units; then a raw material gas is supplied into the inner space of the deposition reactor to additionally form the remaining part of the separation layer C1b on the surface of the uncompleted first core elements C1a; and a completed set of the first core units represented by the first core mean C1 is finally obtained.

In the process of forming the separation layer C1b consisting of a single layer or a plurality of layers according to the present invention, a method for forming the separation layer can be selected from a number of well-established coating methods such as: (i) physical vapor deposition method (including sputtering deposition method, pulsed laser deposition method, ion injection method and ion plating method, etc.); (ii) chemical vapor deposition method (including normal pressure chemical vapor deposition method, metallic organic chemical vapor deposition method, plasma-enhanced chemical vapor deposition method, etc.); (iii) melt spray coating method (including various kinds of spray methods and aerosol deposition method); (iv) thermo-reactive deposition and diffusion method (including molten salt method and powder method); and (v) sol-gel method and solution method.

The thickness of the individual separation layer C1$b$ formed on the surface of the first core element C1$a$ for forming the first core means C1 according of the present invention depends on such factors as the type of or the material of the of the first core element C1$a$, the characteristic of impurity components, the barrier component constituting the separation layer and the method for forming the separation layer, etc. The thickness of the individual separation layer may be in the range of several nanometers (nm) to several millimeters (mm).

In general, the thicker separation layer is believed to more faithfully prevent the diffusion of impurity components from the first core element C1$a$ to the first deposition output D1. However, the separation layer C1$b$ thicker than about 20 mm would impose an excessive cost burden and an unnecessarily large temperature gradient along the separation layer C1$b$, which makes it very difficult to maintain the temperature of the surface of the first deposition output D1 as required. Meanwhile it is also possible to employ here an advanced technology which has recently been developed and used for forming an atomic layer or thin film with a thickness of several nanometers (nm). Such a thin layer with a thickness of 10 nm or less formed by the sophisticated method may also prevent the diffusion of the impurity components. However, considering the dimension of a structural defect often detected on the surface of the first core element C1$a$ and the separation layer C1$b$ and an actual roughness dimension of the interface between the first core element and the separation layer, the thickness of the separation layer C1$b$ should be greater than 10 nm. Accordingly, the overall thickness of the separating layer(s) C1$b$ formed on the first core element C1$a$ of the first core means C1 should preferably be in the range of 10 nm-20 mm in the present invention.

The separation layer(s) C1$b$ may have either an electric conductivity or insulation property. This requires a careful consideration of an electrical characteristic of the outermost separation layer C1$b$ of the first core means C1 when it is connected and fixed to the corresponding, highly conductive electrode units. If the separation layer C1$b$ constituting the first core means C1 has an excellent electric conductivity, it does not matter if the first core element C1$a$ is in contact with the electrode units through the separation layer C1$b$. However, in a case where the separation layer C1$b$ contains a barrier component with an electric insulation property, the separation layer should not be formed at both ends of the first core unit, and thus the conductive electrode units contact directly with the resistive first core element instead of the separation layer that causes a serious contact resistance.

During migration from the first core element C1$a$ to the first deposition output D1, the impurity components can react well or combine with silicon atom. Thus, it does not matter if the separation layer C1$b$ further comprises a silicon separation layer containing silicon as a barrier component to constitute the first core means C1. To prevent the first deposition output D1 from being contaminated by the impurity components the silicon separation layer can be placed between the first core element C1$a$ and the separation layer C1$b$, between the separation layers C1$b$ or at the outmost of the separation layer C1$b$. In this case, it is preferable for the thickness of the added silicon layer to be in the range of 1 μm-10 mm. If its thickness is less than 1 μm, the barrier which can prevent an impurity contamination becomes insufficient. However, when the thickness is greater than 10 mm, the barrier becomes unnecessarily large and requires serious sacrifices in various aspects such as the cost and productivity of the reactor. Regarding the silicon separation layer C1$b$ containing silicon as the barrier component, it does not matter if the separation layer C1$b$ comprises the silicon separation layer C1$b$ which is formed by using the reaction gas Gf as the raw material gas. Here, the formation of the silicon separation layer C1$b$ needs to be optimized in terms of crystal structure and the characteristic of thermal expansion such that the silicon deposition output D1 can be easily separated from the silicon separation layer.

Accordingly, part of the separation layer(s) or the entire separation layer(s) C1$b$ the barrier component and/or silicon can be formed on the surface of the first core element C1$a$ in a deposition reactor according to the present invention, or in an existing conventional deposition reactor constructed by the prior art. The same work can also be executed by using a special coating device, a thin layer forming apparatus or another kind of reactor.

Regardless of whether the separation layer is formed on the surface of the core element C1$a$ or not, it is preferable to perform an heat treatment at a temperature in the range of 400-3,000° C. to remove or to chemically convert the residual impurity components during the process of preparing the first core unit used in the present invention, before/after machining the core element C$a$, or before/after or during the formation of the separation layer or before the operation of silicon deposition. And, it is preferable for the heat treatment of the first core unit or the first core element to be performed at a vacuum pressure or under the gaseous atmosphere such as hydrogen, nitrogen, argon or helium and the like. The heat treatment can be performed in the deposition reactor used in the present invention, the existing conventional deposition reactor constructed by the prior art, or in a special heat treatment or coating device.

The separation layer C1$b$ formed on the first core element C1$a$ according to the present invention does not have an adverse effect on the role of the first core means as an important means for preheating the second core means. Otherwise, the separation layer C1$b$ can prevent or intercept the diffusion of the impurity components from the first core element to the silicon deposition output D1 in the process of silicon deposition at a high temperature. This leads to the preparation of high-purity polycrystalline silicon by using the first core means.

As described above, once the electrical heating of both the first and second core means is initiated, the silicon deposition outputs are formed in an outward direction of the core means through a supply of the reaction gas. This process of silicon deposition is substantially the same as that in the conventional deposition reactor.

In order to use the polycrystalline silicon outputs manufactured according to the present invention as the raw material preparing polycrystalline or single crystalline ingot, block, sheet or film, there is no need to separate the core means and the deposition output from each other for the case of the second deposition output formed outwardly on the second core means C2. Contrary to the case of the second deposition output, it is inevitably necessary for the case of the first deposition output to separate the first core element and/or the separation layer C1$b$ out of the first deposition output D1 formed outwardly on the first core means C1. Following the present invention, the first core element C1a, the separation layer C1b and the first deposition output D1 are different to each other from the aspect of a composition, a crystal structure or a physical characteristic. Therefore, it is not so difficult to separate and collect the first deposition output D1 from the rod-shaped polycrystalline silicon obtained by the present invention. In such separation process, the first core element C1a or the separation layer C1b can be subject to a damage or breakage. However, if the separation layer forming process is carried out in an optimum condition, it is possible to recover the first core element C1a and/or the separation layer C1b as it is and to recycle them for a repeated use.

The polycrystalline silicon output prepared by the present invention can be processed into a cylindrical or hexahedral shape in accordance with the required size and then packaged. Also, the polycrystalline silicon output can be pulverized further into a chunk, nugget, chips or particle shaped silicon product. If necessary, the product is cleaned further and dried to remove the impurity components out of the surface thereof contaminated in the pulverizing process.

The product processed into a cylindrical shape can be used for single crystal growth according to the floating zone method. The pulverized product having irregular shapes and various sizes may be melted in a crucible and then formed into a single crystalline or polycrystalline ingot, block, sheet or film shaped article.

The basic characteristics and the usage of the present invention will be described in detail as follows, with reference to FIGS. 2-7 which are the plane views schematically showing an arrangement of the first core unit and the second unit in plane. However, the present invention is not limited thereto.

First Embodiment

FIG. 2 is a plane view schematically showing an installation arrangement in which 8 sets in total of the rod or the wire shaped core units having a circular cross-section are installed in the deposition reactor.

In this example, the first core means C1 consists of 4 sets of the first core units, where the first core units 1A-1, 1A-2, 1B-1 and 1B-2 are divided into two first core groups, the core units 1A-1 and 1A-2 are referred to as the first core group-A, and the core units 1B-1 and 1B-2 are referred to as the first core group-B.

On the other hand, the second core means C2 also consists of 4 sets of the second core units, where the second core units 2A-1, 2A-2, 2B-1 and 2B-2 are divided into two second core groups, the core units 2A-1 and 2A-2 are referred to as the second core group-A, and the core units 2B-1 and 2B-2 are referred to as the second core group-B.

The electrode units corresponding to the core units constituting each of the core groups are connected to each other in series and the core groups constituting each of the core means are connected to each other in parallel. Thus the electric power supply system is constituted such that the corresponding core means C1, C2 are electrically connected to the electric power supply sources V1, V2, respectively.

To operate the deposition reactor constituted as described above, the electric power is supplied to the first electrical heating means consisting of the first core means C1 and the first electrode means E1 corresponding to the first core units, the electric current flows along the path of 1A-1→1A-1'→1A-2→1A-2' in the first core group-A, and the electric current flows also along the path of 1B-1→1B-1'→1B-2→1B-2'. Once the first core means C1 starts to be electrically heated, the second core units placed around the adjacent first core units start to be naturally preheated thereby.

As illustrated in FIG. 2, excluding a space required for installing gas nozzles used for supplying and exhausting gas, the core groups and the core units are disposed in a space such that the preheating of the second core means C2 can be performed most effectively by the first core means C1 which is being electrically heated. That is, the core groups and the core units are disposed such that the second core unit 2A-1 can be easily preheated by the first core units 1B-1 and 1B-2, the second core unit 2B-1 can be easily preheated by the first core units 1A-1 and 1A-2, the second core unit 2A-2 can be easily preheated by the first core units 1A-1 and 1B-1, and the second core unit 2B-2 can be easily preheated by the first core units 1A-2 and 1B-2.

When being preheated as high as possible to a temperature in the range of 350-1,000° C., the second core means C2 is ready for an electrical heating under a moderate voltage. Once an electrical heating of the second core group-A and the second core group-B is initiated, the electric current flows along the path of 2A-1→2A-1'→2A-2→2A-2' and the path of 2B-1→2B-1'→2B-2→2B-2', respectively. The temperatures of two core means C1 and C2 can be maintained in the required reaction temperature range by controlling the supply of electric power to every core means and every core group.

According to the succeeding deposition process, the silicon rods are formed on two core means C1, C2, and FIG. 2 shows a cross-sectional shape of the corresponding deposition outputs, exampled for only two core units, at the time when the size of a silicon rod output reaches a target value and the deposition reaction on the first deposition output D1 and the second deposition output D2 is terminated.

Here, as illustrated in the drawing, the core means, groups, units and the corresponding electrode means, groups and units require to be disposed in optimum positions such that the preheating of the second core means C2 can be effectively performed at any position in the inner space of the reactor, the silicon deposition outputs D1, D2 can be uniformly grown to a target dimension, and thereby the productivity of the reactor can be maximized.

Second Embodiment

Figure 3:
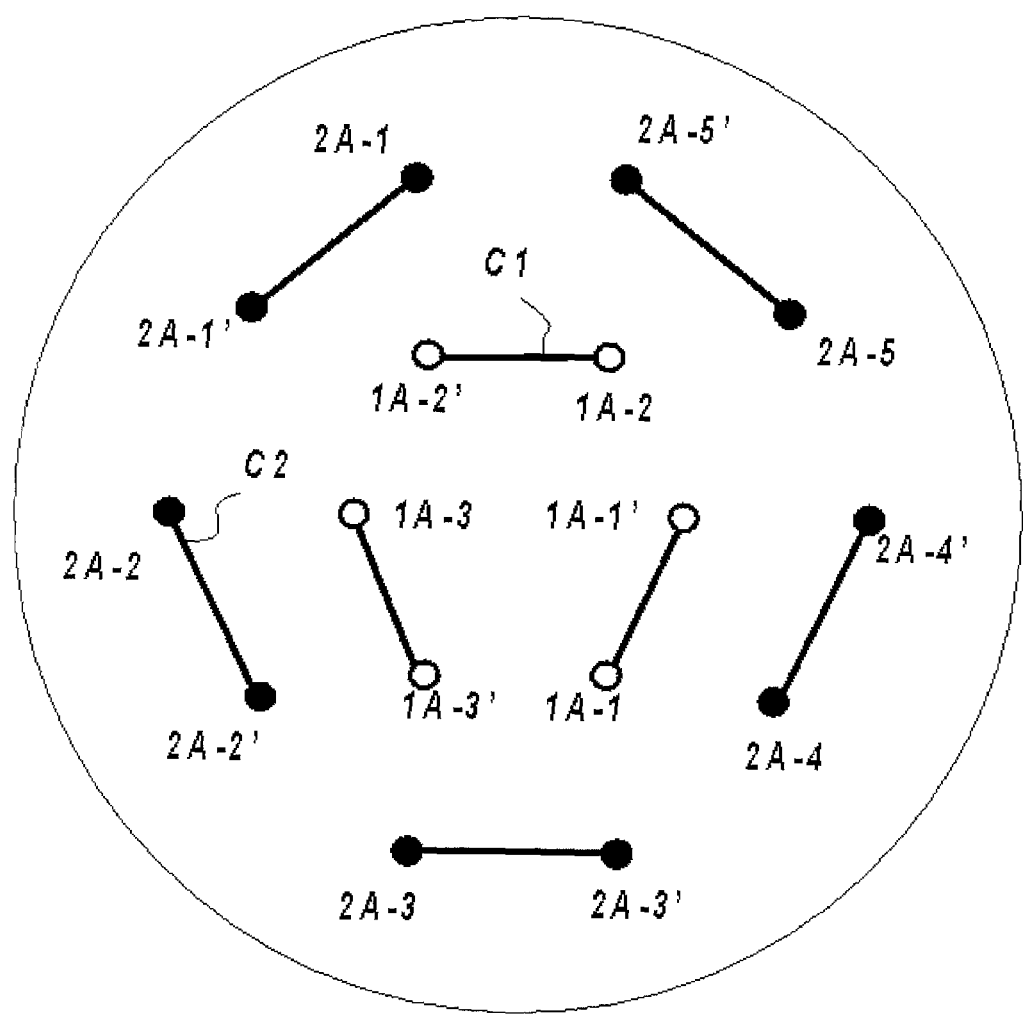

FIG. 3 is a plane view schematically showing another installation arrangement in which 8 sets in total of the rod or the wire shaped core units having a circular cross-section are installed in the deposition reactor, and the number of the first core units differ from that of the second core units.

In this example, the first core means C1 consists of 3 sets of the first core units, where the first core units 1A-1 to 1A-3 are disposed as a single core group.

On the other hand, the second core means C2 consists of 5 sets of the second core units, where the second core units 2A-1 to 2A-5 are also disposed as a single core group.

The electrode units corresponding to the core units for each of the core means C1, C2 are electrically connected to each other in series, and independently connected to the corresponding electric power supply sources V1, V2, respectively, to constitute the electric power supply system.

To operate the deposition reactor constituted as described above, the electric power is supplied to the first electrical heating means consisting of the first core means C1 and the electrode means E1 corresponding to the first core units, the electric current flows along the path of 1A-1→1A-1'→1A-2→1A-2'→1A-3→1A-3'. Once the first core means C1 starts to be electrically heated, the second core units placed around the adjacent first core units start to be naturally preheated thereby.

As illustrated in FIG. 3, excluding a space required for installing gas nozzles used for supplying and exhausting gas, the core groups and the core units are disposed in a space such that the preheating of the second core means C2 can be performed most effectively by the first core means C1 which is being electrically heated. That is, the core groups and the core units are disposed such that the second core unit 2A-1 can be mainly preheated by the first core units 1A-2 and 1A-3, the second core unit 2A-2 can be mainly preheated by the first core unit 1A-3, the second core unit 2A-3 can be mainly preheated by the first core units 1A-1 and 1A-3, the second core unit 2A-4 can be mainly preheated by the first core unit 1A-1, and the second core unit 2A-5 can be mainly preheated by the first core units 1A-1 and 1A-2.

When being preheated as high as possible to a temperature in the range of 350-1,000° C., the second core means C2 is ready for an electrical heating under a moderate voltage. Once an electrical heating of the second core means C2 is initiated, the electric current flows along the path of 2A-1→2A-1'→2A-2→2A-2'→2A-3→2A-3'→2A-4→2A-4'→2A-5→2A-5' in the second core means C2. The temperatures of two core means C1 and C2 can be maintained in the required reaction temperature range by controlling a supply of electric power to every core means.

As described above, although the number of the first core units differs from that of the second core units, the preheating of the second core means C2 can be effectively performed at any position in the inner space of the reactor, and so an electrical heating of the second core means C2 can be easily initiated. Also by supplying a reaction gas Gf with the temperatures of two core means C1 and C2 being maintained in the required reaction temperature range by controlling the supply of electric power to every core means, the silicon deposition outputs D1, D2 can be uniformly grown to a target dimension, and thereby the productivity of the reactor can be maximized.

Third Embodiment

FIG. 4 is a plane view schematically showing a case where 12 sets in total of the core units are installed in the deposition reactor, and the core means C1, C2 consist of different number of core groups and core units to each other.

In this embodiment, the first core means C1 consists of 4 sets of the rod-shaped first core units having a circular cross-section, where the first core units 1A-1 to 1A-4 are disposed as single core group.

On the other hand, the second core means C2 consists of 8 sets of the second core units, which are classified into two second core groups: the second core group-A consisting of the rod-shaped core units 2A-1, 2A-2, 2A-3 and 2A-4 which have a circular cross-section; and the second core group-B consisting of the rod or ribbon shaped core units 2B-1, 2b-2, 2B-3 and 2B-4 which have a rectangular cross-section.

The electrode units corresponding to the core units constituting each of the core groups are connected to each other in series, and the second core group-A and the second core group-B are connected to each other in parallel, and so the electric power supply system is constituted such that the corresponding core means C1, C2 are electrically connected to the electric power supply sources V1, V2, respectively.

To operate the deposition reactor constituted as described above, the electric power is supplied to the first electrical heating means consisting of the first core means C1 and the first electrode means E1 corresponding to each first core units, the electric current flows along the path of 1A-1→1A-1'→1A-2→1A-2'→1A-3→1A-3'→1A-4→1A-4', and so the first core means C1 starts to be electrically heated and the second core units placed around the adjacent first core units start to be naturally preheated thereby.

As illustrated in FIG. 4, excluding a space required for installing gas nozzles used for supplying and exhausting gas, the core groups and the core units are disposed in a bilaterally/vertically symmetric manner such that the preheating of the second core means C2 can be performed most effectively by the first core means C1 that is being electrically heated. For example, the core groups and the core units are disposed such that the second core unit 2A-1 can be mainly preheated by the first core unit 1A-2, the second core unit 2A-2 can be mainly preheated by the first core units 1A-1, 1A-2 ad 1A-3, the second core unit 2B-2 can be mainly preheated by the first core units 1A-2 and 1B-3 and the second core unit 2B-1 can be mainly preheated by the first core units 1A-3 and 1A-4.

When being preheated as high as possible to a temperature in the range of 350-1,000° C., the second core means C2 is ready for an electrical heating under a moderate voltage. Once an electrical heating of the second core groups A and B is initiated, the electric current flows along the path of 2A-1→2A-1'→2A-2→2A-2'→2A-3→2A-3'→2A-4→2A-4' and along the path of 2B-1→2B-1'→2B-2→2B-2'→2B-3→2B-3'→2B-4→2B-4', respectively. The temperatures of two core means C1 and C2 can be maintained in the required reaction temperature range by controlling the supply of electric power to every core means and every core group.

At this time, although it is permissible to electrically heat the second core group-A and the second core group-B simultaneously, it does not matter whether an electrical heating of the second core group-A is first initiated, if its preheating is achieved more rapidly. Then, the preheating of the second core group-B can be accelerated by the first core means and the second core group-A, which are being electrically heated in advance. Thereby, the electrical heating of the second core group-B can be initiated earlier.

According to the succeeding deposition process, where the silicon rods are formed on two core means C1, C2, FIG. 4 shows a cross-sectional shape of the corresponding deposition outputs, exampled for only three core units, at the time when the size of a silicon rod output reaches a target value, and the deposition reaction on the first deposition output D1 and the second deposition output D2 is terminated.

As described above, although the respective numbers of the core groups and core units constituting the core means C1, C2 and the cross-sections of the respective core elements are different to each other, the preheating of the second core means C2 can be effectively performed at any position in the inner space of the reactor, and so its electrical heating can initiate simultaneously or in sequence. Through the preheating process, the silicon deposition outputs D1, D2 can be uniformly grown to a target dimension, and thereby the productivity of the reactor can be maximized.

Fourth Embodiment

Figure 5:
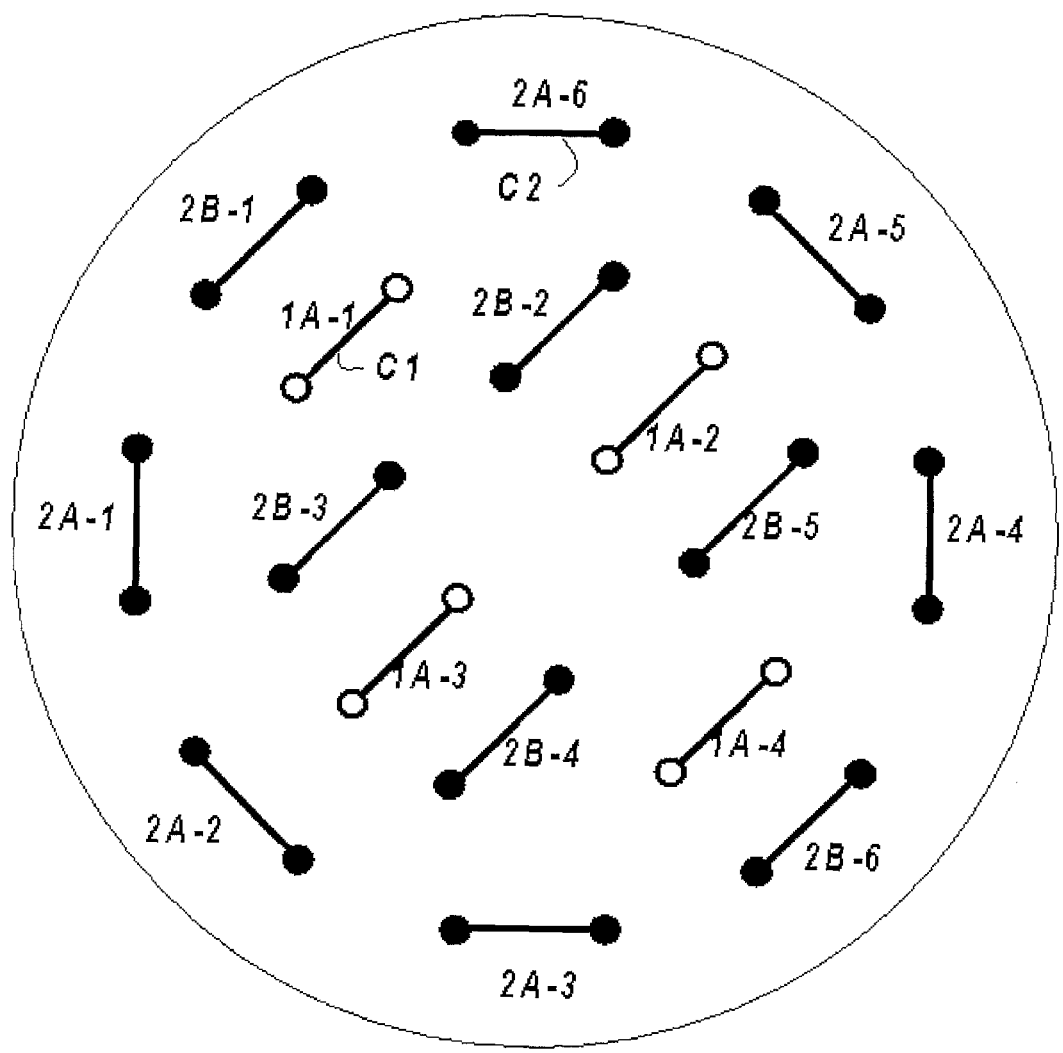

FIG. 5 is a plane view schematically showing a case, where 16 sets of the core units having a circular cross-section are installed in the deposition reactor, and the core means C1, C2 consist of different number of core groups and core units to each other.

In this embodiment, the first core means C1 consists of 4 sets of the rod-shaped first core units, where the first core units 1A-1 to 1A-4 are disposed as single core group.

On the other hand, the second core means C2 consists of 12 sets of the rod-shaped second core units, which are classified into two second core groups: the second core group-A consisting of the core units 2A-1, 2A-2, 2A-3, 2A-4, 2A-5 and 2A-6; and the second core group-B consisting of the core units 2B-1, 2B-2, 2B-3, 2B-4, 2B-5 and 2B-6.

The electrode units corresponding to the core units constituting each of the core groups are connected to each other in series, and the second core group-A and the second core group-B are connected to each other in parallel, and so the electric power supply system is constituted such that the corresponding core means C1, C2 are electrically connected to the electric power supply sources V1, V2, respectively.

To operate the deposition reactor constituted as described above, once the electric power is supplied to the first electrical heating means consisting of the first core means C1 and the electrode means E1 corresponding to each first core units, the electric current flows along the path of 1A-1→1A-1'→1A-2→1A-2'→1A-3→1A-3'→1A-4→1A-4', and so the first core means C1 starts to be electrically heated and the second core units placed around the adjacent first core units start to be naturally preheated thereby.

As illustrated in FIG. 5, excluding a space required for installing gas nozzles used for supplying and exhausting gas, the core groups and the core units are disposed in a bilaterally/vertically symmetric manner such that the preheating of the second core means C2 can be performed effectively by the first core means C1 which is being electrically heated. However, compared with the second core group-B, the installation arrangement is less beneficial to the second core group-A with respect to the preheating by the first core means C1. For example, the core units of the second core group-B are disposed in parallel with the first core units in parallel, being preheated easily by an adjacent pair of vertical sections of the respective first core units which is electrically heated in advance. However, the core units of the second core group-A are disposed somehow perpendicular to and more distantly positioned from the first core units such that the preheating of these core units could be more belated.

When being preheated as high as possible to a temperature in the range of 350-1,000° C., the second core group-B is ready for an electrical heating under a moderate voltage. Once an electrical heating of the second core group B is initiated, the electric current flows along the path of 2B-1→2B-1'→2B-2→2B-2'→2B-3→2B-3'→2B-4→2B-4'→2B-5→2B-5'→2B-6→2B-6'. In this case the core units of the second group-A is preheated not only by the adjacent first core units but also by the adjacent second core units constituting the second core group-B, and thereby the preheating of the second group-A can be completed more rapidly and its electrical heating can be initiated earlier.

As described above, after all the core units in the deposition reactor start to be electrically heated in sequence, the temperatures of two core means C1, C2 can be maintained in the required reaction temperature range by controlling the supply of electric power to every core means and every core group.

Although the number of the first core units and the second core units differ from each other and the second core groups are disposed in a different preheating environment as described above, the electrical heating of the second core means C2 can start in sequence. Also by supplying a reaction gas Gf with the temperatures of two core means C1 and C2 being maintained in the required reaction temperature range by controlling the supply of electric power to every core means, the silicon deposition outputs D1, D2 can be uniformly grown to a target dimension, and thereby the productivity of the reactor can be maximized.

Fifth Embodiment

FIG. 6 is a plane view schematically showing a case, where 12 sets in total of the core units are installed in the deposition reactor, and the core means C1, C2 consist of different cross-sectional shapes and different number of core units to each other.

In this embodiment, the first core means C1 consists of 4 sets of the conduit or tube shape first core units having an concentric (hollow) rectangular cross-section, where the first core units 1A-1 to 1A-4 are disposed as a single core group.

On the other hand, the second core means C2 consists of 8 sets of the ribbon or strip shape second core units having a rectangular cross-section, where the second core units 2A-1 to 2A-8 are also disposed as single core group.

The electrode units corresponding to the core units constituting each of the core means C1, C2 are connected to each other in series, and so the electric power supply system is constituted such that the corresponding core means C1, C2 are electrically connected to the electric power supply sources V1, V2, respectively.

To operate the deposition reactor constituted as described above, the electric power is supplied to the first electrical heating means consisting of the first core means C1 and the electrode means E1 corresponding to each first core units, the electric current flows along the path of 1A-1→1A-1'→1A-2→1A-2'→1A-3→1A-3'→1A-4→1A-4', and so the first core means C1 starts to be electrically heated and the second core units placed around the adjacent first core units start to be naturally preheated thereby.

As illustrated in FIG. 6, excluding a space required for installing gas nozzles used for supplying and exhausting gas, the core groups and the core units are disposed in a bilaterally/vertically symmetric manner such that the preheating of the second core means C2 can be performed most effectively by the first core means C1 that is being electrically heated. For example, the second core units 2A-1 and 2A-2 can be mainly preheated by an adjacent parts of the first core units 1A-1 and 1A-4 and those of the first core unit 1A-1, respectively.

When being preheated as high as possible to a temperature in the range of 350-1,000° C., the second core means C2 is ready for an electrical heating under a moderate voltage. Once an electrical heating of the second core means C2 is initiated, the electric current flows through the core units 2A-1 to 2A-7 in order, and the temperatures of two core means C1 and C2 can be maintained in the required reaction temperature range by controlling the supply of electric power for every core means.

According to the succeeding deposition process, two differently dimensioned silicon rods are obtained, where the deposition outputs D1, D2 with a similar thickness are formed on two core means C1, C2, respectively. FIG. 6 illustrates the cross-sectional shapes of the deposition outputs at a time when the size of a silicon rod output reaches a target value and the deposition reaction is terminated.

As described above, although the number and the cross-sectional shapes of the first core units and the second core units differ from each other, the preheating of the second core means C2 is effectively carried out at any location in the inner space of the reactor, and thus the electrical heating of the second core mean C2 can be also easily initiated. Also by supplying a reaction gas Gf with the temperatures of two core means C1 and C2 being maintained in the required reaction temperature range by controlling the supply of electric power to every core means, the silicon deposition outputs D1, D2 can be uniformly grown to a target dimension, and thereby the productivity of the reactor can be maximized.

Sixth Embodiment

Figure 7:
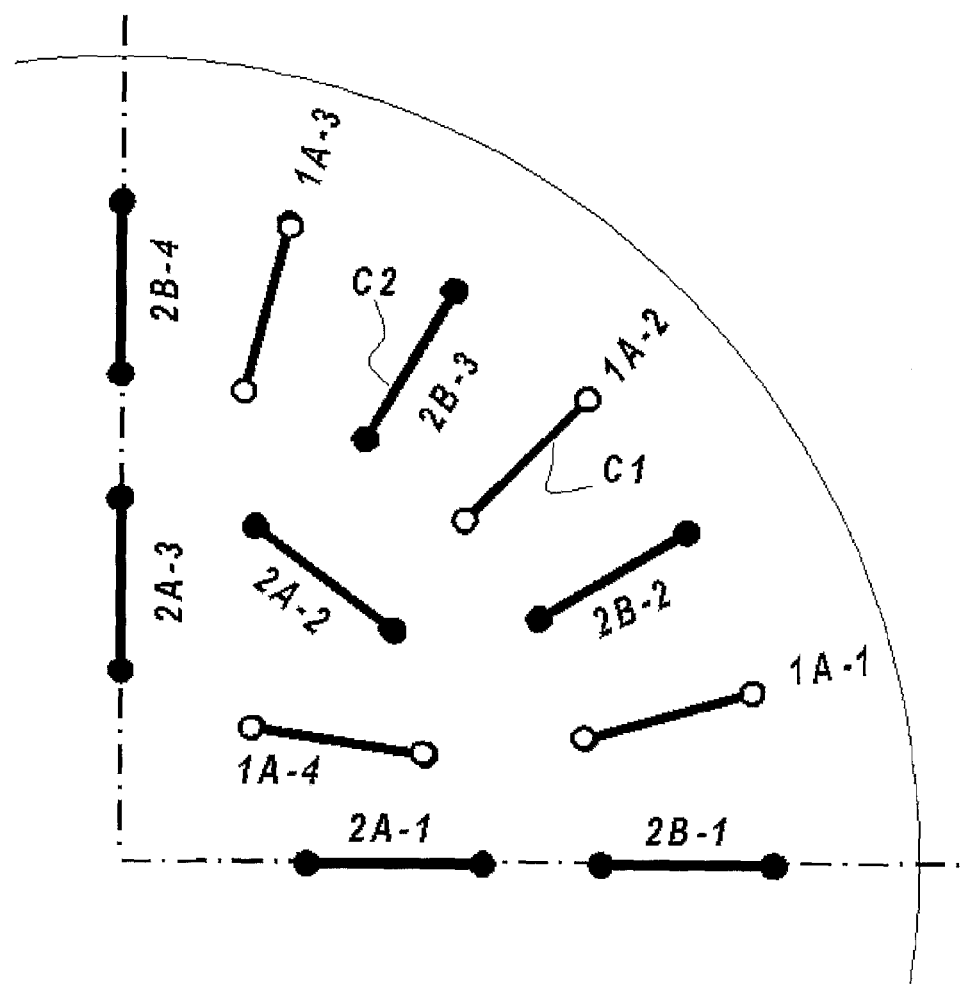

FIG. 7 is the first quadrant of a plane view when 36 sets in total of core units having an identical circular cross-section are installed in the deposition reactor which has a larger diameter than that of the reactor illustrated in FIG. 5. Here, the core means C1, C2 respectively consists of the core groups and the core units which differ from each other in the number.

In this reactor, the first core means C1 consists of 16 sets of rod-shaped first core units, where the first core units are classified into two first core groups: the first core group-A consisting of core units 1A-1 to 1A-8; and the first core group-B consisting of core units 1B-1 to 1B-8. FIG. 7 illustrates only the quarter portion of the core units comprised in the first core group-A corresponding to the first quadrant.

On the other hand, the second core means C2 consists of 20 sets of the rod-shaped second core units, where the second core units are classified into four second core groups: the second core group-A1 consisting of the core units 2A-1 to 2A-4; the second core group-A2 consisting of the core units 2A-5 to 2A-8; the second core group-B1 consisting of the core units 2B-1 to 2B-6; and the second core group-B2 consisting of the core units 2B-7 to 2B-12. FIG. 7 illustrates only the quarter portion of the core units comprised in the second core group-A1 and the second core group-B1 corresponding to the first quadrant.

The electrode units corresponding to the core units constituting each of the core groups are connected to each other in series, and the first core groups-A and -B and the second core group-A1, -A2, -B1 and -B2 are connected to each other in parallel, and so the electric power supply system is constituted such that the corresponding core means C1, C2 are electrically connected to the electric power supply sources V1, V2, respectively.

To operate the deposition reactor constituted as described above, the electric power is supplied to the first electrical heating means consisting of the first core means C1 and the electrode means E1 corresponding to each first core units, the electric current flows along the path of 1A-1 to 1A-8 in the first core group-A and also flows along the path of 1B-1 to 1B-8 in the first core group-B and so the first core means C1 starts to be electrically heated and the second core units placed around the adjacent first core units start to be naturally preheated thereby.

Here, the electrical heating of the first core means C1 may be started either in a simultaneous manner or in sequence according to the first core groups.

As illustrated in FIG. 7, excluding a space required for installing gas nozzles used for supplying and exhausting gas, the core groups and the core units are disposed in a bilaterally/vertically symmetric manner such that the preheating of the second core means C2 can be performed most effectively by the first core means C1 that is electrically heated. However, compared with the second core groups-B1 and -B2, the installation arrangement is less beneficial to the second core groups-A1 and -A2 with respect to the preheating by the first core means C1. For example, the second core units such as 2B-2 or 2B-3 constituting the second core groups-B1 and -B2 are disposed adjacent to and in parallel with the first core unit which is electrically heated in advance. However, although the core units constituting the second core groups-A1 and -A2 are disposed adjacent to the first core unit, these core units are disposed such that they are preheated with more difficulty than the second core groups-B1 and -B2, and thus the preheating of the second core groups-A1 and -A2 can possibly be somehow belated than the second core groups-B1 and -B2.

When the second core groups-B1 and -B2 are preheated as high as possible in the temperature range of 350-1,000° C., these second core groups become ready for an electrical heating under a moderate voltage. Upon initiating the supply of electricity to them, the electric current flows in the corresponding groups along the path of the second core units 2B-1 to 2B-6 in order, and also flows along another path of the second core units 2B-7 to 2B-12 in order. Then, the preheating of the second core groups-A1 and -A2 can be accelerated by the contribution of the adjacent second core units constituting the second core groups-B1 and -B2 in addition to the neighboring first core units. According to the sequential heating scheme, the preheating of the second core groups-A1 and -A2 can be completed more rapidly, and the start of there electrical heating can be accelerated thereby. Upon initiating the supply of electricity to them, the electric current flows in the corresponding groups along the path of the second core units 2A-1 to 2A-4 in order and also flow along another path of the second core units 2A-5 to 2A-8 in order.

As described above, after all the core units in the deposition reactor start to be electrically heated in sequence, the temperatures of two core means C1, C2 can be maintained in the required reaction temperature range by controlling the supply of electric power to every core means and every core group.

If the degree of preheating is not apparent between the second groups in the preheating process, the entire second core means C2, that is, the electrical heating of the entire second core groups may be initiated at the same time.

Although the number of the first core units and the second core units differ from each other and the second core groups are disposed in a different preheating environment as described above, the electrical heating of the second core means C2 can start in sequence. Also by supplying a reaction gas Gf with the temperatures of two core means C1 and C2 being maintained in the required reaction temperature range by controlling the supply of electric power to every core means, the silicon deposition outputs D1, D2 can be uniformly grown to a target dimension, maximizing the productivity of the reactor.

Seventh Embodiment

FIGS. 8-12 are illustrative views schematically showing the states that the silicon deposition output D1 is formed according to the present invention; these drawings show schematically cross-sectional views (a) and longitudinal sectional views (b) that can be observed by cutting the silicon rod outputs in the directions of diameter and axial length, respectively.

As shown in each drawing for the rod-shaped first core element C1a, the separation layers C1b, C1b', and C1b", with outer diameters being db, db', and db", respectively, are formed on the surface of the first core element C1a of diameter da, by which first core unit is constituted. The silicon deposition output D1 is formed outwardly on the surface of the first core unit with diameter of d1(t) at time t from the start of silicon deposition so that the silicon rod output is manufactured.

Figure 8:
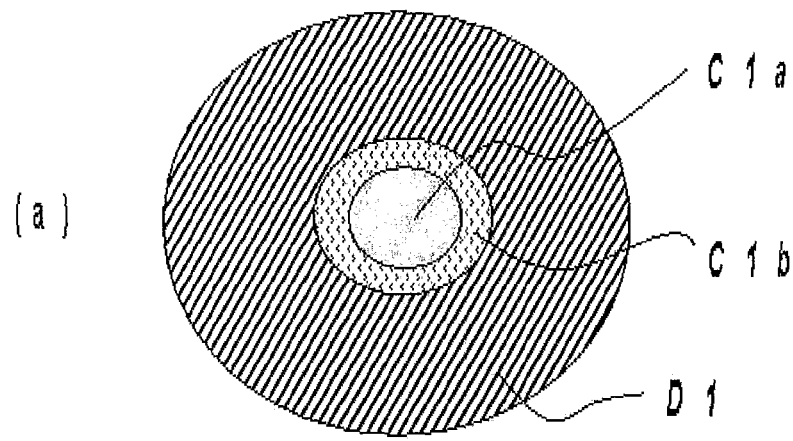
Figure 8:
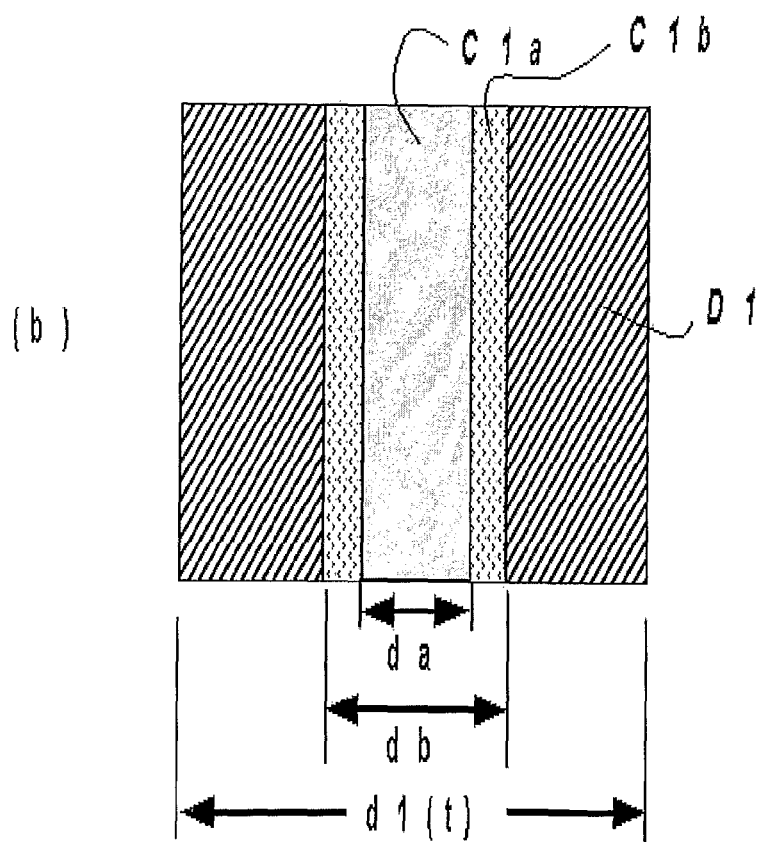
Figure 9:
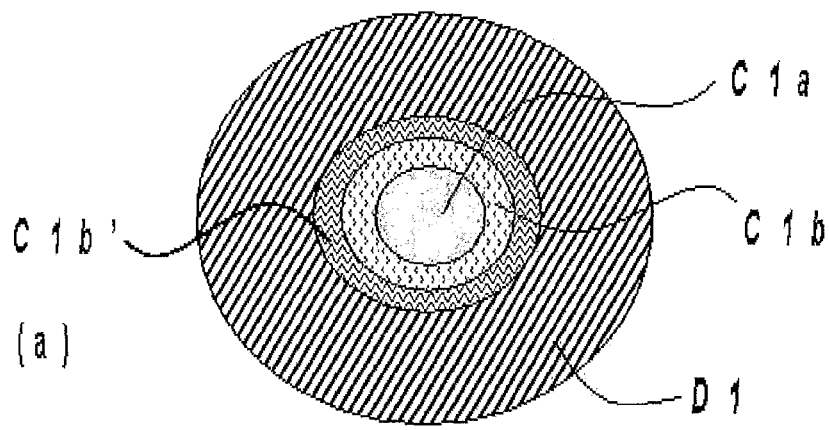
Figure 9:
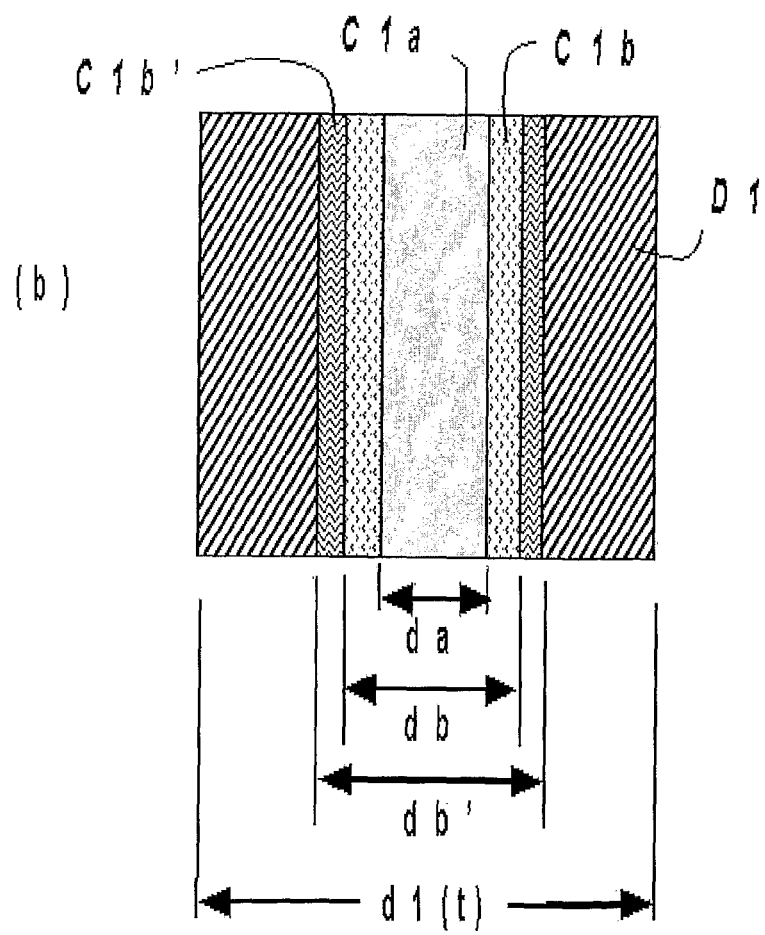
Figure 10:
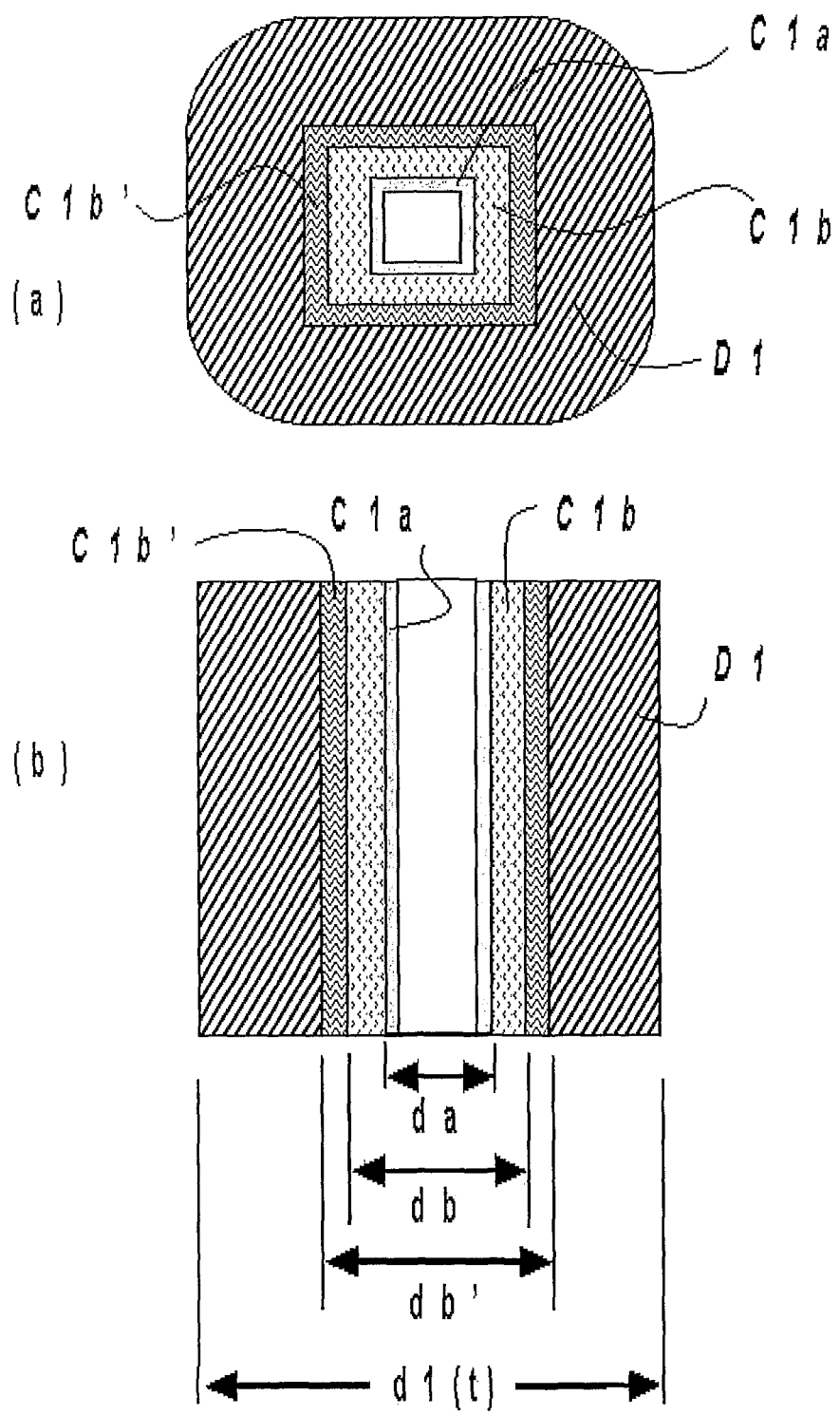

FIG. 8 shows illustrative views schematically showing a cross-section (a) and a longitudinal section (b) of the silicon rod in the course of forming the silicon deposition output D1 of diameter d1(t) outwardly on the surface of the first core unit constituted by forming one separation layer C1b with outer diameter db on the surface of the rod-shaped first core element C1a having a circular cross-section of diameter da;

FIG. 9 shows illustrative views schematically showing a cross-section (a) and a longitudinal section (b) of the silicon rod in the process of forming the silicon deposition output D1 of diameter d1(t) outwardly on the surface of the first core unit constituted by forming two kinds of the separation layers C1b and C1b' with outer diameters db and db', respectively, on the surface of the rod-shaped first core element C1a having a circular cross-section of diameter da;

FIG. 10 shows illustrative views schematically showing a cross-section (a) and a longitudinal section (b) of the silicon rod in the course of forming the silicon deposition output D1 of width d1(t) outwardly on the surface of the first core unit constituted by forming two kinds of the separation layers C1b and C1b' with outer widths db and db', respectively, on the surface of the conduit-shaped or tube-shaped first core element C1a having a hollow, concentric rectangular cross-section of width da;

FIG. 11 shows illustrative views schematically showing a cross-section (a) and a longitudinal section (b) of the silicon rod in the process of forming the silicon deposition output D1 of diameter d1(t) outwardly on the surface of the first core unit constituted by forming three kinds of the separation layers C1b, C1b', and C1b" with outer diameters db, db', and db", respectively, on the surface of the rod-shaped first core element C1a having a circular cross-section of diameter da; and FIG. 12 shows illustrative views schematically showing a cross-section (a) and a longitudinal section (b) of the silicon rod in the course of forming the silicon deposition output D1 of width d1(t) outwardly on the surface of the first core unit constituted by forming two kinds of the separation layers C1b and C1b' with outer widths Wb and Wb', respectively, on the surface of the strip- (or ribbon-) shaped first core element C1a having a rectangular cross-section of width Wa.

The procedure and methods for constituting the first core means by forming one or a plurality of separation layers C1b, C1b', and C1b" on the surface of the first core element C1a, as shown in the drawings, are the same as described hereinabove in detail.

Meanwhile, the silicon deposition output D2 is also formed outwardly on the surface of the second core means C2 comprising no separation layers, following silicon deposition. As illustrated in FIG. 13 for a longitudinal section of the second deposition output D2, the diameter of D2 increases from d2(t=0) at the start of silicon deposition to the value of d2(t) at time t.

INDUSTRIAL APPLICABILITY

As described above, the method and the apparatus for preparing the polycrystalline silicon rod according to the present invention has the advantages as follows.

1) Unlike the conventional bell-jar process, the second core means made of high-purity silicon material is preheated by the first core means which is made of a resistive material and is electrically heated in advance, and thus an electrical heating of the second core means can be carried out easily and rapidly without a separate preheating means, an expensive and complicated electric power supply apparatus or a complicated preheating procedure.

2) Considering that an electric power supply and control equipment play the most important roles in the conventional bell-jar type deposition process and the economical burden is mainly ascribed to the cost for preheating of the silicon core means, the present invention has the advantage of greatly reducing the investment costs for the deposition process equipment and the production cost for preparing the rod-shaped polycrystalline silicon.

3) According to the present invention, the silicon deposition output is identically formed in an outward direction not only on the surface of the second core means, but also on the surface of the first core means that serves as a preheating means of the second core means, and thus a preheating problem of the core means can be resolved without lowering the production capacity of the deposition reactor.

4) The method of the present invention can easily and promptly solve the preheating problem of the silicon core means in a newly designed deposition reactor as well as a conventional deposition reactor, thus having an extended scope of its utilization in the manufacture of rod-shaped polycrystalline silicon.

5) Since two core means with a different material quality are employed in the deposition reactor by the present invention, it is possible to simultaneously manufacture two different grades of polycrystalline silicon products for use in both the solar cells and the semiconductor devices.

6) The separation layer formed on the surface of the first core element according to the present invention can inhibit or deter the diffusion of impurity components from the first core element to the deposition output, and it is thus possible to manufacture high-purity polycrystalline silicon outputs even by using the non-silicon first core means.

While the present invention has been described and illustrated herein with reference to the preferred embodiment thereof, it will be apparent to those skilled in the art that various modifications and variations can be made therein without departing from the spirit and the scope of the invention. Thus, it is intended that the present invention covers the modifications and the variations of this invention that come within the scope of the appended claims and their equivalents.

The invention claimed is:

1. A method for preparing a polycrystalline silicon rod using a mixed core means, comprising:
   (a) installing a first core means made of a resistive material together with a second core means made of a silicon material in an inner space of a deposition reactor;
   (b) electrically heating the first core means for the purpose of heating the first core means without being cooled;
   (c) pre-heating the second core means by radiation heat transfer by the first core means which is electrically heated;
   (d) electrically heating the second core means after the second core means is pre-heated; and
   (e) supplying a reaction gas into the inner space in a state where the first core means and the second core means are electrically heated for silicon deposition by thermal decomposition so that silicon deposition occurs outwardly on the first core means and on the second core means with a first deposition output and a second deposition output being formed on the first core means and on the second core means, respectively, at a reaction pressure in the range of 1-20 bar absolute and a reaction temperature in the range of 650-1300° C. based on the surface temperature of the first deposition output and/or the second deposition output.

2. The method for preparing the polycrystalline silicon rod using a mixed core means as set forth in claim 1, wherein, in the step of electrically heating the preheated second core means, the entire second core means is electrically heated simultaneously or the second core means is divided into a plurality of second core groups which start to be electrically heated in groups at different starting times.

3. The method for preparing the polycrystalline silicon rod using a mixed core means as set forth in claim 1, wherein, in the step of pre-heating the second core means, the second core means is pre-heated to a temperature in the range of 350-1,000° C. with the first core means being electrically heated to a temperature in the range of 400-3,000° C.

4. The method for preparing the polycrystalline silicon rod using a mixed core means as set forth in claim 1, wherein, in the step of pre-heating the second core means, the second core means is preheated in the inner space at a pressure in the range of 1-20 bar absolute under an atmosphere selected from the group consisting of hydrogen, nitrogen, argon, helium and a mixture thereof.

5. The method for preparing the polycrystalline silicon rod using a mixed core means as set forth in claim 1, wherein the reaction gas contains at least one silicon-containing component selected from the group consisting of monosilane ($SiH_4$), dichlorosilane ($SiH_2Cl_2$), trichlorosilane ($SiHCl_3$), silicon tetrachloride ($SiCl_4$) and a mixture thereof.

6. The method for preparing the polycrystalline silicon rod using a mixed core means as set forth in claim 5, wherein the reaction gas further contains at least one gas component selected from the group consisting of hydrogen, nitrogen, argon, helium, hydrogen chloride, and a mixture thereof.

7. The method for preparing the polycrystalline silicon rod using a mixed core means as set forth in claim 1, wherein the silicon deposition occurs in the inner space at a reaction pressure in the range of 1-20 bar absolute and a reaction temperature in the range of 650-1,300° C. based on the surface temperature of the first deposition output and/or the second deposition output.

8. The method for preparing the polycrystalline silicon rod using a mixed core means as set forth in claim 1, wherein a solar-grade polycrystalline silicon to be used for solar cells is formed in the first deposition output, and an electronic-grade polycrystalline silicon to be used for semiconductor devices is formed in the second deposition output.

9. The method for preparing the polycrystalline silicon rod using a mixed core means as set forth in claim 1, wherein the resistive material is a metal or an alloy comprising at least one metal element selected from the group consisting of tungsten (W), rhenium (Re), osmium (Os), tantalum (Ta), molybdenum (Mo), niobium (Nb), iridium (Ir), ruthenium (Ru), technetium (Tc), hafnium (Hf), rhodium (Rh), vanadium (V), chromium (Cr), zirconium (Zr), platinum (Pt), thorium (Th), lanthanum (La), titanium (Ti), lutetium (Lu), yttrium (Y), ferrum (Fe), nickel (Ni), aluminum (Al) and a mixture thereof.

10. The method for preparing the polycrystalline silicon rod using a mixed core means as set forth in claim 1, wherein the resistive material is a ceramic metal material containing at least one component selected from the group consisting of molybdenum silicide (Mo—Si), lanthanum chromium oxide (La—Cr—O), zirconia and a mixture thereof.

11. The method for preparing the polycrystalline silicon rod using a mixed core means as set forth in claim 1, wherein the resistive material is a carbon-based material comprising at least one component selected from the group consisting of amorphous carbon, graphite, silicon carbide (SiC) and a mixture thereof.

12. The method for preparing the polycrystalline silicon rod using a mixed core means as set forth in claim 1, wherein the silicon material is selected from the group consisting of intrinsic polycrystalline silicon, intrinsic single crystalline silicon, doped silicon and a mixture thereof.

\* \* \* \* \*